(12) United States Patent
Kobayashi et al.

(10) Patent No.: US 12,174,151 B2
(45) Date of Patent: Dec. 24, 2024

(54) MOVING INSPECTION DEVICE, MOVING INSPECTION METHOD, AND METHOD FOR MANUFACTURING STEEL MATERIAL

(71) Applicant: JFE STEEL CORPORATION, Tokyo (JP)

(72) Inventors: Masaki Kobayashi, Tokyo (JP); Koji Yamashita, Tokyo (JP); Kouyou Miyawaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 319 days.

(21) Appl. No.: 17/641,624

(22) PCT Filed: Sep. 15, 2020

(86) PCT No.: PCT/JP2020/034854
§ 371 (c)(1),
(2) Date: Mar. 9, 2022

(87) PCT Pub. No.: WO2021/054313
PCT Pub. Date: Mar. 25, 2021

(65) Prior Publication Data
US 2022/0326192 A1     Oct. 13, 2022

(30) Foreign Application Priority Data
Sep. 19, 2019   (JP) ................................ 2019-170644

(51) Int. Cl.
*G01N 29/265*     (2006.01)
*G01N 29/04*      (2006.01)
(Continued)

(52) U.S. Cl.
CPC ......... *G01N 29/265* (2013.01); *G01N 29/043* (2013.01); *G01N 29/225* (2013.01);
(Continued)

(58) Field of Classification Search
CPC .. G01N 29/265; G01N 29/043; G01N 29/225; G01N 29/28; G01N 29/04;
(Continued)

(56) References Cited

U.S. PATENT DOCUMENTS 5,642,198 A * 6/1997 Long .................... G01N 21/896
                                                356/430
7,017,261 B2 * 3/2006 Okamoto ........... H05K 13/0413
                                                29/840
(Continued)

FOREIGN PATENT DOCUMENTS

CN      102003951 A      4/2011
CN      105891334 A      8/2016
(Continued)

OTHER PUBLICATIONS

Dec. 1, 2020 International Search Report issued in International Patent Application No. PCT/JP2020/034854.
(Continued)

*Primary Examiner* — Jacques M Saint Surin
(74) *Attorney, Agent, or Firm* — Oliff PLC

(57) ABSTRACT

A moving inspection device capable of realizing significant size reduction/weight reduction without affecting the inspection performance for an inspection target, a moving inspection method, and a method for manufacturing a steel material. A moving inspection device includes: a moving inspection device body configured to inspect an inspection target for defects while moving over a surface of the inspection target; and water supply devices separate from the body and configured to supply water required for the inspection onto the surface of the inspection target. The body is installed with a flow adjustment plate configured to push out the water supplied onto the surface of the inspection target from the water supply devices in the advancing direction and form streamlines for supplying the water (Continued)

between inspection sensors configured to inspect the inspection target for defects and the surface of the inspection target simultaneously with the movement of the body.

11 Claims, 13 Drawing Sheets

(51) Int. Cl.
   *G01N 29/22* (2006.01)
   *G01N 29/28* (2006.01)
(52) U.S. Cl.
   CPC ..... *G01N 29/28* (2013.01); *G01N 2291/0234* (2013.01); *G01N 2291/0289* (2013.01)
(58) Field of Classification Search
   CPC .... G01N 29/22; G01N 29/023; G01N 29/044; G01N 29/263; G01N 2292/0234; G01N 2292/0289; G01N 2292/2632; G01N 2292/2638
   USPC .......................................................... 73/618
   See application file for complete search history.

(56) References Cited

U.S. PATENT DOCUMENTS

| | | | | |
|---|---|---|---|---|
| 7,627,163 | B2* | 12/2009 | Chang | G01N 21/952 |
| | | | | 382/152 |
| 7,743,660 | B2* | 6/2010 | Marsh | G01N 29/265 |
| | | | | 73/633 |
| 8,599,379 | B2* | 12/2013 | Sakai | G01N 21/9505 |
| | | | | 356/369 |
| 9,442,096 | B2* | 9/2016 | Fujiwara | G01N 29/28 |
| 11,181,573 | B2* | 11/2021 | Endo | G01R 31/2881 |
| 2007/0068286 | A1 | 3/2007 | Piper | |
| 2019/0242728 | A1 | 8/2019 | Low et al. | |
| 2021/0003538 | A1 | 1/2021 | Toyozumi et al. | |
| 2022/0155767 | A1* | 5/2022 | Ohara | G05B 19/41875 |
| 2022/0326192 | A1* | 10/2022 | Kobayashi | G01N 29/225 |

FOREIGN PATENT DOCUMENTS

| | | | |
|---|---|---|---|
| CN | 109765294 | A | 5/2019 |
| GB | 1060816 | A | 3/1967 |
| GB | 1 114 835 | A | 5/1968 |
| JP | S53-013425 | | 4/1978 |
| JP | S53-063087 | A | 6/1978 |
| JP | S60-066157 | A | 4/1985 |
| JP | S62-144066 | A | 6/1987 |
| JP | S63-079059 | A | 4/1988 |
| JP | H06-023741 | | 3/1994 |
| JP | 2006-526766 | A | 11/2006 |
| JP | 2014-089173 | A | 5/2014 |
| JP | 2014-092517 | A | 5/2014 |
| JP | 2015-194491 | A | 11/2015 |
| JP | 5954241 | B2 | 7/2016 |
| JP | 5999214 | B2 | 9/2016 |
| RU | 2 376 596 | C2 | 12/2009 |
| WO | 2019/172338 | A1 | 9/2019 |

OTHER PUBLICATIONS

Mar. 15, 2022 International Preliminary Report on Patentability issued in International Application No. PCT/JP2020/034854.
Aug. 18, 2023 Office Action and Search Report issued in Chinese Patent Application No. 202080065901.2.
May 26, 2022 Office Action issued in Russian Patent Application No. 2022106959.
Sep. 15, 2022 European Search Report Issued in European Patent Application No. 20864836.0.
Oct. 4, 2022 Office Action Issued in Japanese Patent Application No. 2021-514147.
Aug. 20, 2024 Office Action issued in Korean Patent Application No. 10-2022-7008396.

* cited by examiner

MOVING INSPECTION DEVICE, MOVING INSPECTION METHOD, AND METHOD FOR MANUFACTURING STEEL MATERIAL

TECHNICAL FIELD

The present invention relates to a moving inspection device inspecting an inspection target for defects while moving over the surface of the inspection target, a moving inspection method, and a method for manufacturing a steel material.

BACKGROUND ART

Conventionally, in order to ensure the quality of metal plates, such as steel plates, as an inspection target, the steel plates or the like are inspected for surface defects or internal defects by ultrasonic flaw detection or the like. In the ultrasonic flaw detection, a plurality of ultrasonic flaw detection heads as inspection sensors arranged in parallel is brought into contact with a metal plate, such as a steel plate, conveyed on a feed roller of a production line via a water film, and then the metal plate is automatically inspected in on-line, for example. In off-line, the ultrasonic flaw detection heads are moved by a hand carriage or the like to be brought into contact with a stopped metal plate, such as a steel plate, via a water film, and then the metal plate is manually inspected.

In general, the ultrasonic flaw detection heads are connected to an ultrasonic flaw detector body with a flaw detection cable, outputs (results) obtained by the flaw detection by the ultrasonic flaw detection heads are input into the ultrasonic flaw detector body, and the outputs (result) are input into a data processing device to be processed, so that the metal plate is inspected for the presence or absence of internal defects. In the case of the ultrasonic flaw detection, water as a medium for passing ultrasonic waves is sprayed to an inspection surface (surface) of the metal plate, such as the steel plate, so that a water film is formed on the inspection surface (surface) of the metal plate. Therefore, when performing the ultrasonic flaw detection of the metal plate as the inspection target in off-line, the surface of the metal plate is wet with water to be slippery. The metal plate is placed on a skid or the like installed on the floor surface in many cases, and therefore an inspector moves on the wet metal plate with a level difference, which causes a risk that the inspector falls.

In order to perform highly accurate ultrasonic flaw detection, the ultrasonic flaw detection heads as the inspection sensors need to be accurately moved along a predetermined scanning line. However, a preparation to draw the scanning line on the metal plate requires time and labor and, at the same time, there is a limit to the accuracy of the manual movement of the ultrasonic flaw detection heads.

In order to eliminate such inconvenience caused by the manual operations, moving inspection devices for metal plate have been proposed in the past, and, for example, those illustrated in PTLS 1 and 2 have been proposed.

A moving inspection device for metal plate illustrated in PTL 1 is a moving inspection device for metal plate inspecting a metal plate using an indoor position measuring system performing self-position measurement in an indoor space based on the principle of triangulation. The moving inspection device for metal plate includes a carriage having: four wheels capable of rotating forward and backward; and a drive unit rotating and driving the wheels and individually and independently turning and driving the wheels, and traveling over the metal plate surface. The carriage is further mounted with a navigation signal transmitter or a navigation signal receiver constituting the indoor position measuring system and transmitting or receiving an indoor position measuring system signal and is provided with inspection sensors inspecting a metal plate for defects. A metal plate moving inspection device includes a control means of calculating a deviation from a self-position recognized using the indoor position measuring system signal and a target position, instructing the drive unit to rotate the wheels forward, rotate the wheels backward, stop the wheels, and turn each wheel according to the deviation, and causing the carriage to move laterally, obliquely, forward and backward, or turn on the spot to cause the carriage to autonomously travel to a predetermined target position.

A moving inspection device for metal plate illustrated in PTL 2 is a moving inspection device for metal plate moving over a metal plate based on information from a position measuring means and inspecting the metal plate for the presence or absence of defects present on the surface of the metal plate or inside the metal plate and including a carriage having at least two wheels capable of rotating forward and backward and a drive unit driving the wheels. The carriage is mounted with flaw detection heads each provided with an ultrasonic flaw detection probe inspecting the metal plate. The moving inspection device for metal plate includes a control unit calculating a deviation between the position of the inspection device recognized by the position measuring means and a target position, instructing the drive unit to rotate the wheels forward, rotate the wheels backward, and stop the wheels such that the deviation is minimized, and controlling the inspection device to autonomously travel to a predetermined target position. The control means has a function of detecting either or both of a weight change of the inspection device and sliding resistance between the metal plate and the flaw detection heads and feedbacking a correction value obtained from the detected values to the instruction.

CITATION LIST

Patent Literatures

PTL 1: JP 5954241 B
PTL 2: JP 5999214 B

SUMMARY OF INVENTION

Technical Problem

However, the conventional moving inspection devices for metal plate illustrated in PTLS 1 and 2 have had the following problems.

More specifically, in both the moving inspection devices for metal plate illustrated in PTLS 1 and 2, a water tank for constantly supplying water between the inspection sensors (flaw detection heads) and the metal plate is mounted on the carriage and water is supplied between the inspection sensors (flaw detection heads) and the metal plate from the water tank through a water supply hose. Therefore, the weight of the carriage mounted with the inspection sensors (flaw detection heads) significantly increases, and thus a point to be improved has been found in the manual operability of the inspection device (carriage).

In contrast thereto, a case where the carriage itself is not mounted with a water tank and water is constantly supplied between the inspection sensors (flaw detection heads) and the metal plate from another place has posed a problem that water cannot be uniformly sprayed onto the surface of the metal plate depending on the surface state of the metal plate, which hinders the inspection of the metal plate for defects.

Therefore, the present invention has been made to solve the conventional problems. It is an object of the present invention to provide a moving inspection device capable of realizing significant size reduction/weight reduction without affecting the inspection performance for an inspection target, a moving inspection method, and a method for manufacturing a steel material.

Solution to Problem

In order to achieve the above-described object, a moving inspection device according to one aspect of the present invention includes: a moving inspection device body configured to inspect an inspection target for defects while moving over the surface of the inspection target; and a water supply device provided separately from the moving inspection device body and configured to supply water required for the inspection onto the surface of the inspection target, in which the moving inspection device body is installed with a flow adjustment plate configured to push out the water supplied onto the surface of the inspection target from the water supply device in the advancing direction and forma streamline for supplying the water between an inspection sensor configured to inspect the inspection target for defects and the surface of the inspection target simultaneously with the movement of the moving inspection device body.

A moving inspection method according to another aspect of the present invention includes inspecting an inspection target for defects using the above-described moving inspection device.

A method for manufacturing a steel material according to another aspect of the present invention includes an inspection step of implementing the above-described moving inspection method.

Advantageous Effects of Invention

The moving inspection device, the moving inspection method, and the method for manufacturing a steel material according to the present invention can provide a moving inspection device capable of realizing significant size reduction/weight reduction without affecting the inspection performance for an inspection target, a moving inspection method, and a method for manufacturing a steel material.

BRIEF DESCRIPTION OF DRAWINGS

FIGS. 14A and 14B illustrate a modification of the water supply device, in which FIG. 14A is a side view and FIG. 14B is a perspective view;

DESCRIPTION OF EMBODIMENTS

Hereinafter, embodiments of the present invention will now be described with reference to the drawings. The following embodiments illustrate devices and methods for embodying the technical idea of the present invention. The technical idea of the present invention does not specify materials, shapes, structures, arrangement, and the like of constituent parts to the following embodiments. The drawings are schematic. Therefore, it should be noted that the relationship, ratio, and the like between the thickness and the planar dimension are different from the actual relationship, ratio, and the like. The drawings include portions different in mutual dimensional relationships and ratios.

First, the entire inspection system including a moving inspection device according to one embodiment of the present invention is described with reference to FIG. 1.

Figure 1:
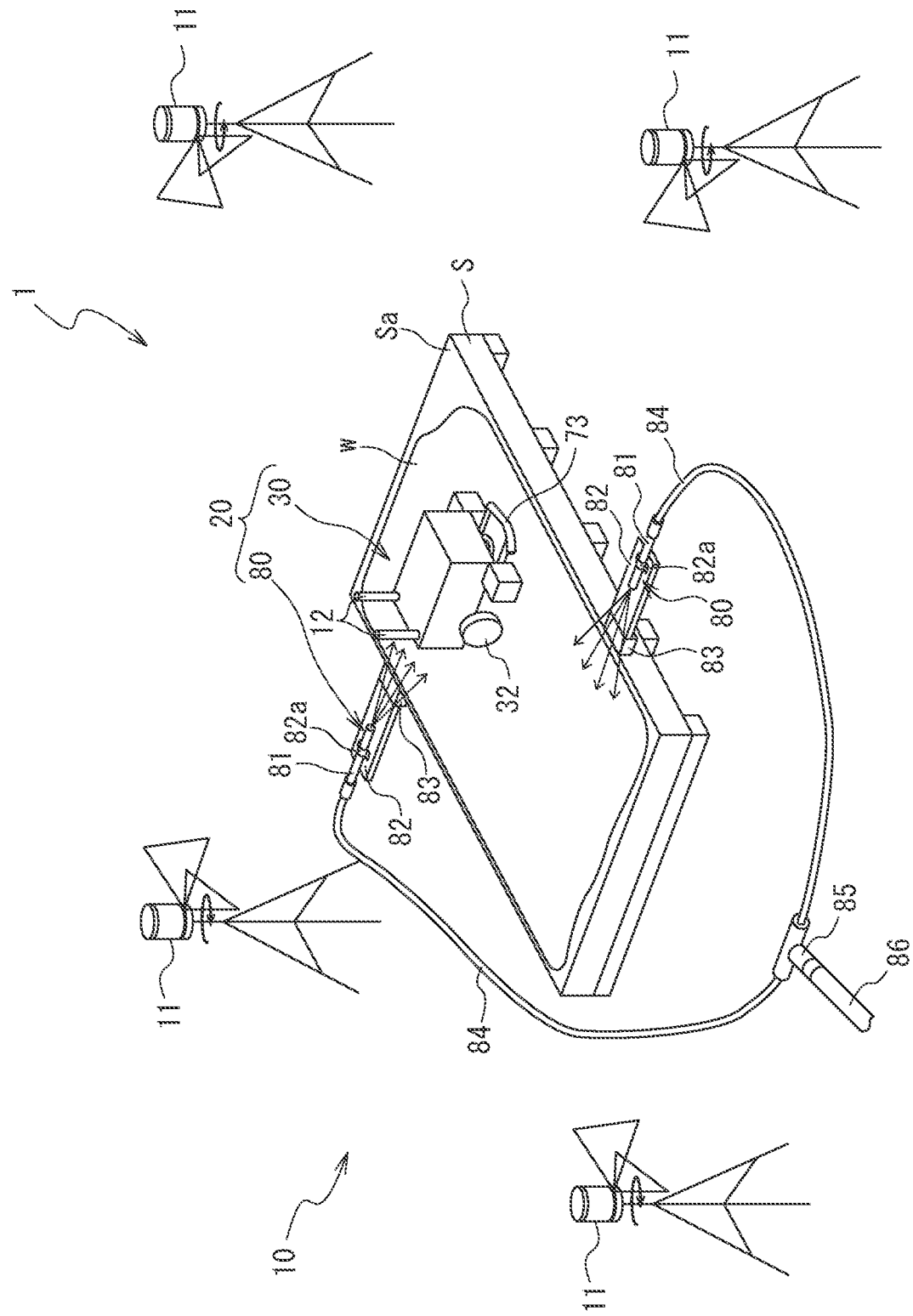
FIG. 1 is a view illustrating the schematic configuration of the entire inspection system including a moving inspection device according to one embodiment of the present invention.

FIG. 1 illustrates the schematic configuration of the entire inspection system including the moving inspection device according to one embodiment of the present invention. An inspection system 1 includes an indoor position measuring system 10 and a moving inspection device 20.

The indoor position measuring system 10 measures the self-position indoors based on the principle of triangulation and uses an indoor global positioning system (IGPS) in this embodiment. Specifically, the indoor position measuring system 10 includes a plurality of navigation transmitters 11 arranged indoors, navigation receivers 12, and a current position calculation unit 13 (see FIG. 2) calculating the position of a moving inspection device body 30 by position calculation software.

The moving inspection device 20 includes the moving inspection device body 30 inspecting a steel plate S as an inspection target for internal defects of the steel plate S and surface defects of the rear surface side of the steel plate S while moving over the surface Sa of the steel plate S and water supply devices 80 suppling water W required for the inspection onto the surface Sa of the steel plate S. As the steel plate S as the inspection target, a thick steel plate (plate thickness of 6 mm or more) is targeted herein.

Figure 3:
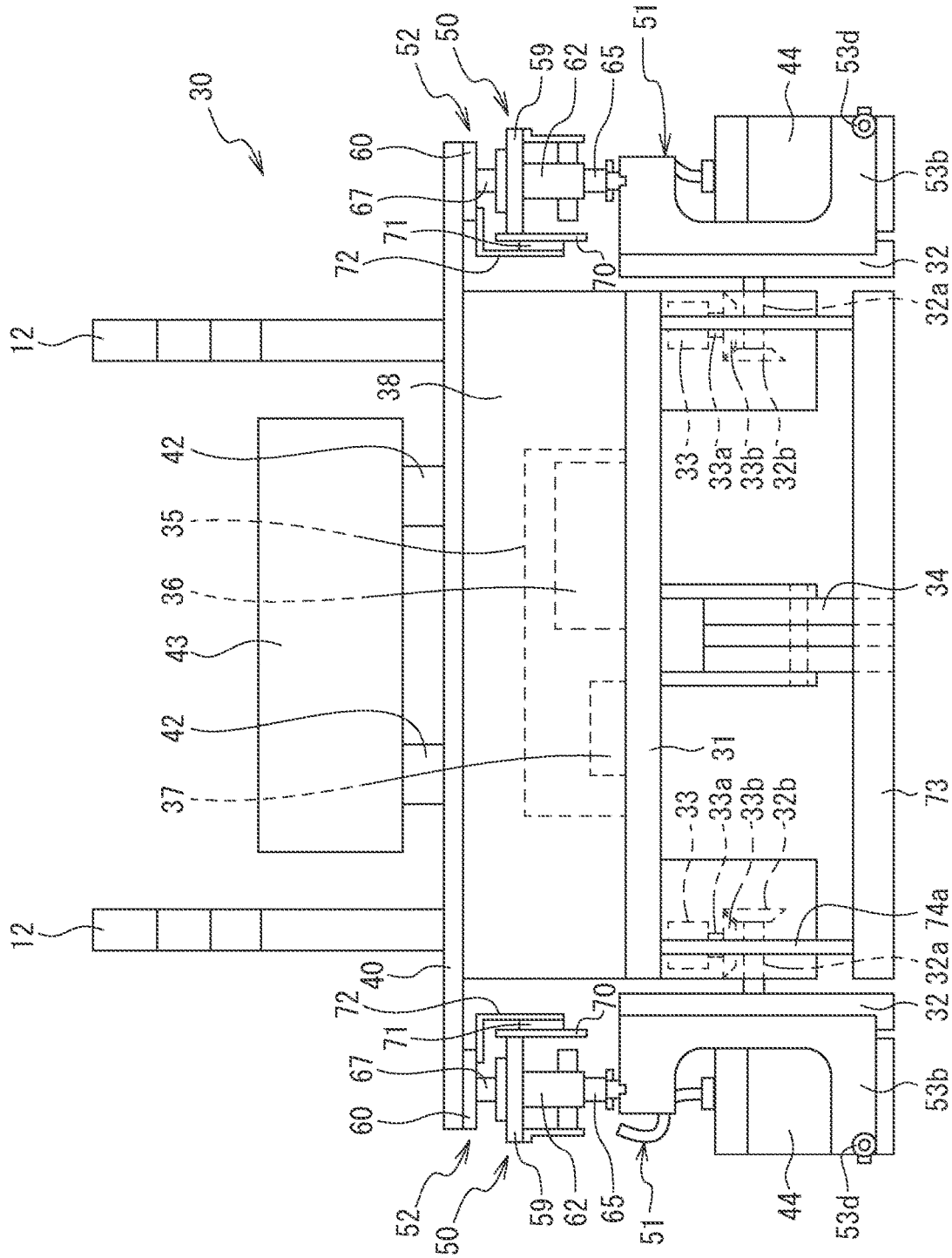
FIG. 3 is a front view of a moving inspection device body constituting the moving inspection device according to one embodiment of the present invention.
Figure 4:
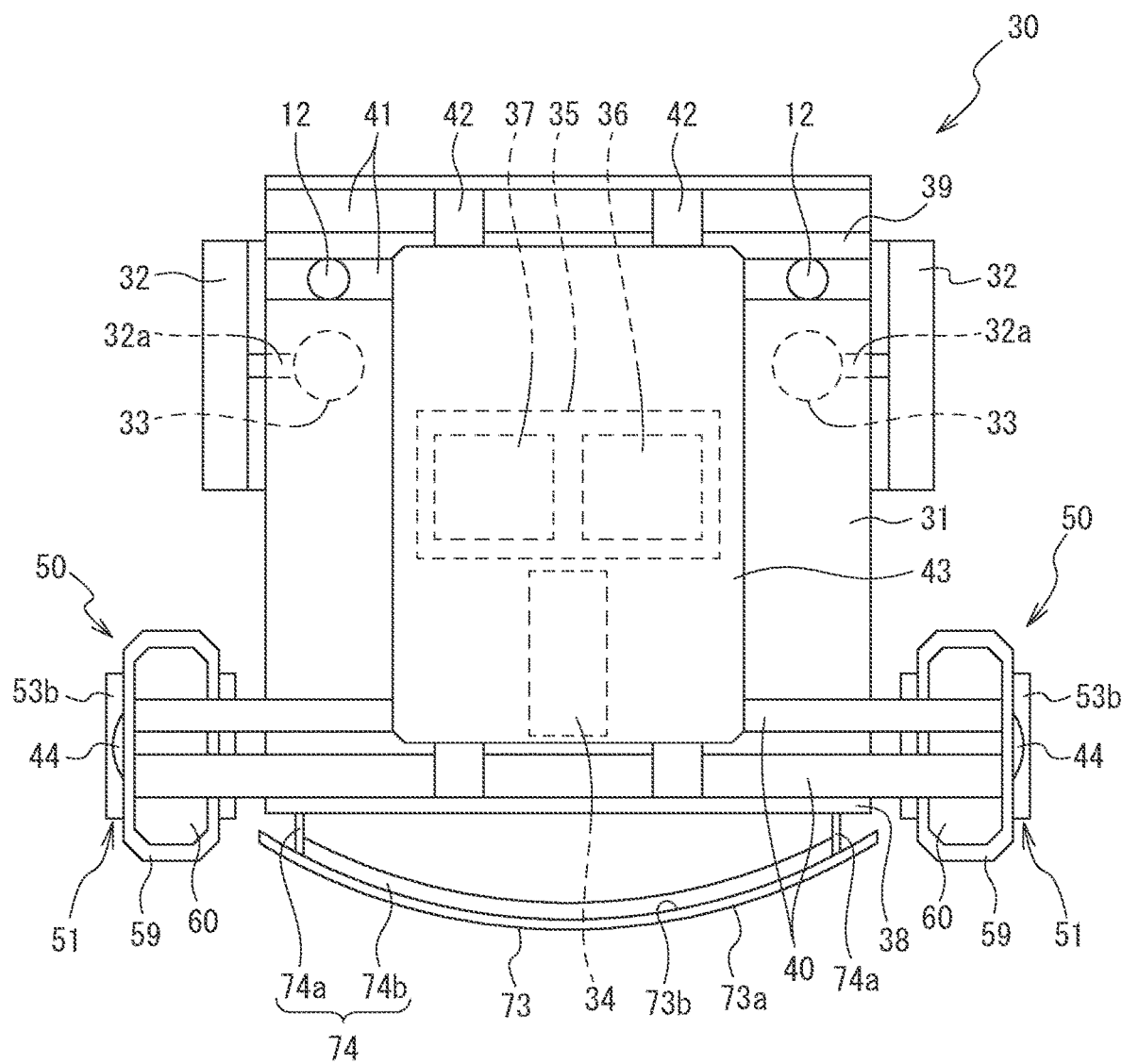
FIG. 4 is a plan view of the moving inspection device body illustrated in FIG. 3.
Figure 5:
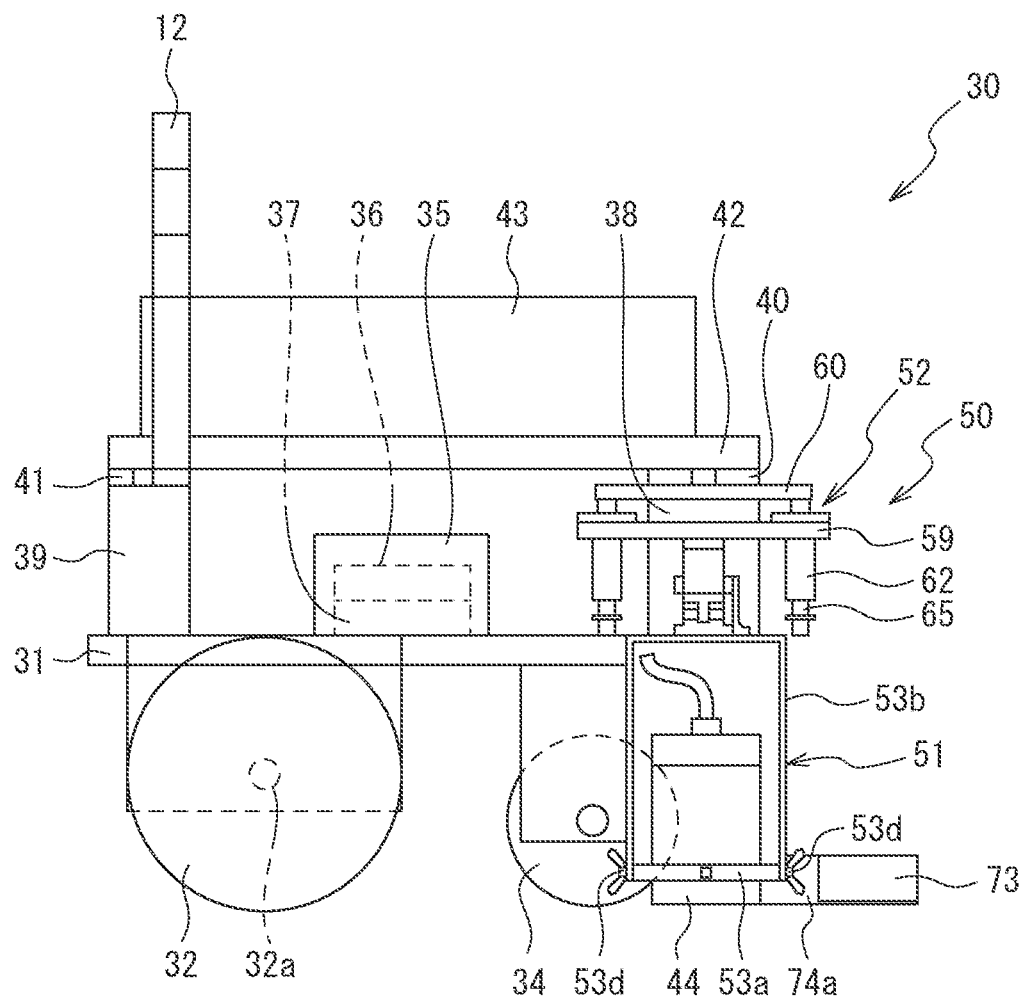
FIG. 5 is a left side view of the moving inspection device body illustrated in FIG. 3.
Figure 6:
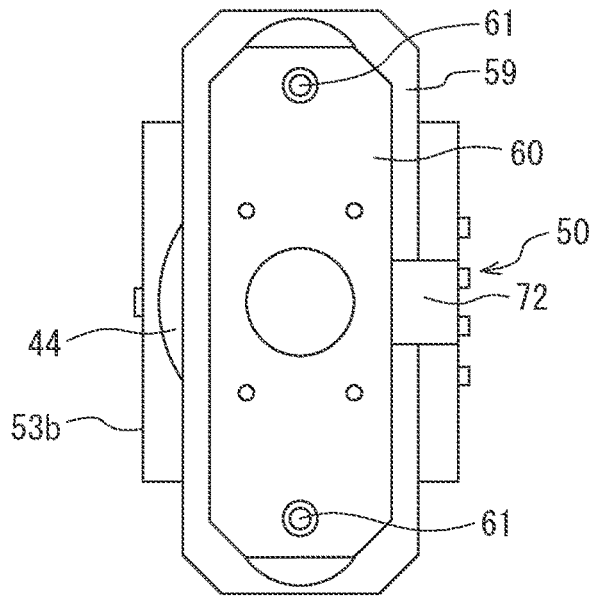
FIG. 6 is a plan view of a follow-up mechanism causing a mounted head to follow the uneven state of the surface of the steel plate in the moving inspection device body illustrated in FIG. 3.

The moving inspection device body (hereinafter referred to as "inspection device body") 30 includes a carriage 31 having a predetermined plate thickness and extending in the right and left direction (right and left direction in FIG. 3) and in the forward and backward direction (up and down direction in FIG. 4) as illustrated in FIG. 3 to FIG. 5. The carriage 31 is provided with a pair of right and left wheels 32 at both ends in the right and left direction on the front (upper side in FIG. 4) side. The pair of right and left wheels 32 is individually and independently driven. Each wheel 32 has a rotation shaft 32a having first intersecting axis gears 32b at the tip as illustrated in FIG. 3. The first intersecting axis gears 32b are meshed with second intersecting axis gears 33b provided at the tip of an output rotation shaft 33a of a speed reduction gear of a wheel driving motor 33. Each wheel 32 can be rotated forward and backward by the wheel driving motor 33. The carriage 31 is further installed with a driven wheel 34 capable of moving in all directions in a substantially center part in the right and left direction on the rear side of the undersurface side.

The carriage 31 is further provided with flaw detection heads 44 each including with an ultrasonic probe as inspection sensors detecting internal defects of the steel plate S and surface defects of the rear surface side of the steel plate S and an ultrasonic flaw detector body 43 into which outputs (results) from the flaw detection heads 44 are input and which data (calculation)-processes the outputs (results) and outputs the data processing results to an IO board 37 described below.

As illustrated in FIG. 3 to FIG. 5, a first raised part 38 extending in the right and left direction is erected near the rear end of the upper surface of the carriage 31 and a second raised part 39 extending in the right and left direction is erected near the front end of the upper surface of the carriage 31. As illustrated in FIG. 3 to FIG. 5, a plurality of first plate members 40 extending in the right and left direction to project from the ends in the right and left direction of the carriage 31 is installed on the upper surface of the first raised part 38 and a plurality of second plate members 41 extending in the right and left direction is installed on the upper surface of the second raised part 39. Further, a plurality of third plate members 42 extending in the forward and backward direction to bridge the first plate members 40 and the second plate members 41 are installed on the upper surfaces the first plate members 40 and the upper surfaces of the second plate members 41. On the upper surfaces of the third plate members 42, the above-described ultrasonic flaw detector body 43 is installed.

A pair of flaw detection heads 44 is installed on the rear end sides of the carriage 31 below the first plate members 40 projecting from the ends in the right and left direction end of the carriage 31 as illustrated in FIG. 3 to FIG. 5. Each flaw detection head 44 is supported to the first plate members 40 by a follow-up mechanism 50 causing the flaw detection head 44 to follow the unevenness state of the surface Sa of the steel plate S as the inspection target. The follow-up mechanism 50 is described in detail later.

Further, a pair of navigation receivers 12 is erected near both the right and left ends on the second plate member 41 and an on-board computer 36 and an IO board 37 are provided in a control box 35 on the upper surface of the carriage 31.

Each navigation transmitter 11 of the indoor position measuring system 10 emits rotating fan beams. Each navigation receiver 12 receives the rotating fan beams emitted from each navigation transmitter 11. At this time, the rotating fan beams are deviated at a predetermined angle, and the three-dimensional coordinate values, i.e., the position or the height, of the navigation receivers 12 receiving the rotating fan beams can be measured. Reception information received by the navigation receivers 12 is transmitted to the on-board computer 36, and the positions of the navigation receivers 12 are calculated by the on-board computer 36 according to the principle of triangulation. By the use of signals received from the plurality of navigation transmitters 11 and by repeating the calculation, position information of the traveling inspection device body 30 mounted with the navigation receivers 12 can be acquired in real time.

The On-board computer 36 is a computer system constituted to include a ROM, a RAM, a CPU, and the like and realizing each function described later on software by executing various dedicated programs stored in advance in the ROM and the like.

Figure 2:
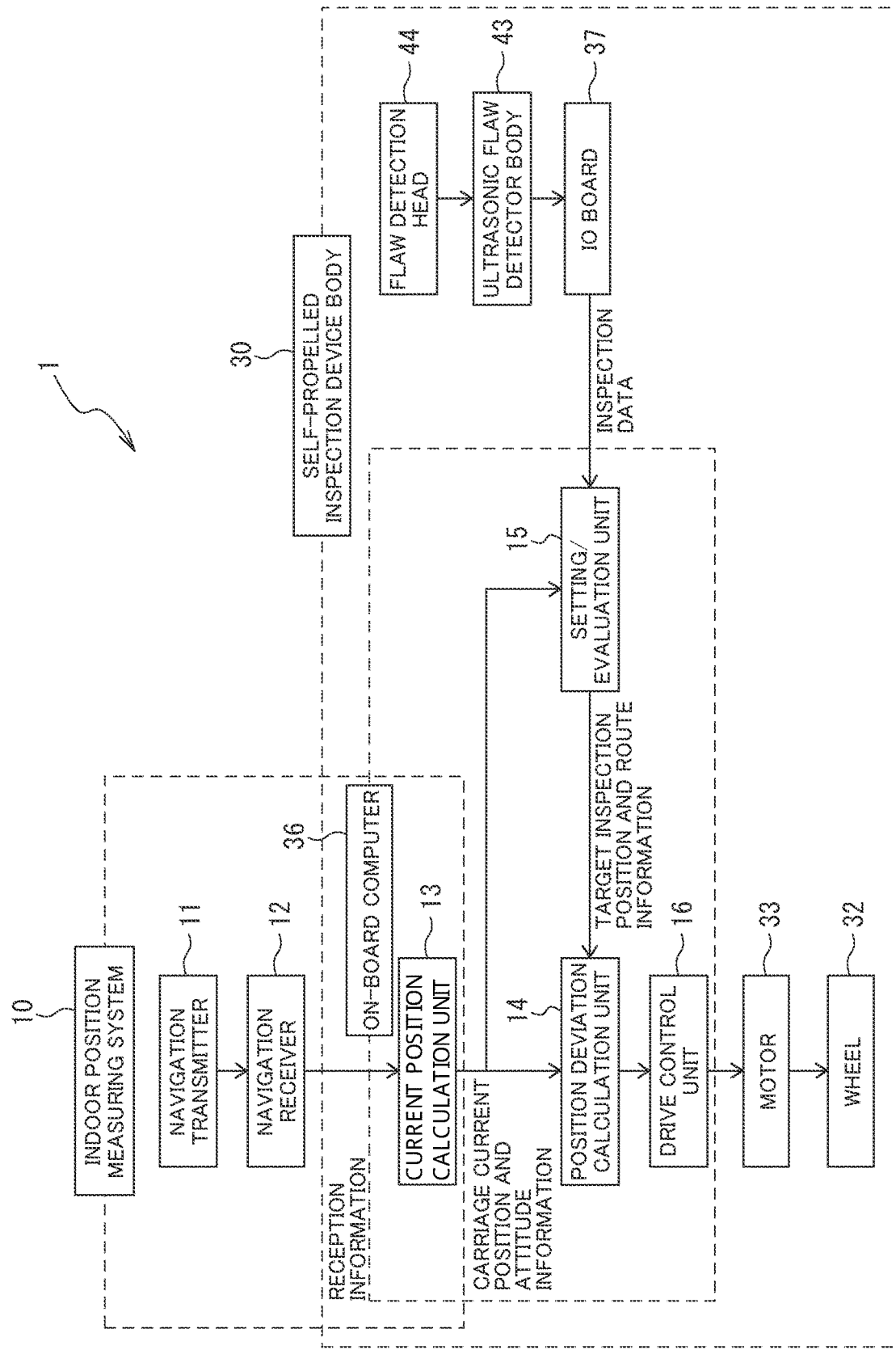
FIG. 2 is a block diagram of the inspection system illustrated in FIG. 1.

As illustrated in FIG. 2, the on-board computer 36 includes the current position calculation unit 13 calculating the current position of each navigation receiver 12 based on the reception information received by each navigation receiver 12. The on-board computer 36 further includes a setting/evaluation unit 15 setting a target inspection position and route information and evaluating inspection data and inspection position information from the IO board 37. The on-board computer 36 further includes a position deviation calculation unit 14 calculating a deviation of the current position with respect to the target inspection position based on the current position of each navigation receiver 12 calculated by the current position calculation unit 13 and the target inspection position from the setting/evaluation unit 15. The on-board computer 36 further includes a drive control unit 16 outputting a control signal, such as a speed command, to the wheel driving motor 33 such that the deviation calculated by the position deviation calculation unit 14 is 0 and performing feedback control of the speed (including the rotation direction) of the wheels 32. The drive control unit 16 outputs a control signal, such as a speed command, to the wheel driving motor 33 such that the deviation is 0 and performs the feedback control of the speed (including the rotation direction) of the wheels 32, so that the inspection device body 30 autonomously travels along the target travel route.

Although not illustrated, the carriage 31 is mounted with a battery as a power source.

Next, the follow-up mechanism 50 causing each flaw detection head 44 to follow the uneven state of the surface Sa of the steel plate S is described with reference to FIG. 6 to FIG. 10.

Herein, the uneven state of the surface Sa of the steel plate S means not only a case where the surface Sa of the steel plate S has unevenness but all cases where the surface Sa of the steel plate S is uneven, also including a case where the surface Sa of the steel plate S has waviness.

The follow-up mechanism 50 includes a sensor holding mechanism 51 holding the flaw detection head 44 as the inspection sensor and a load adjustment mechanism 52 adjusting a load applied to the surface Sa of the steel plate S by the flaw detection head 44 held by the sensor holding mechanism 51.

Figure 8:
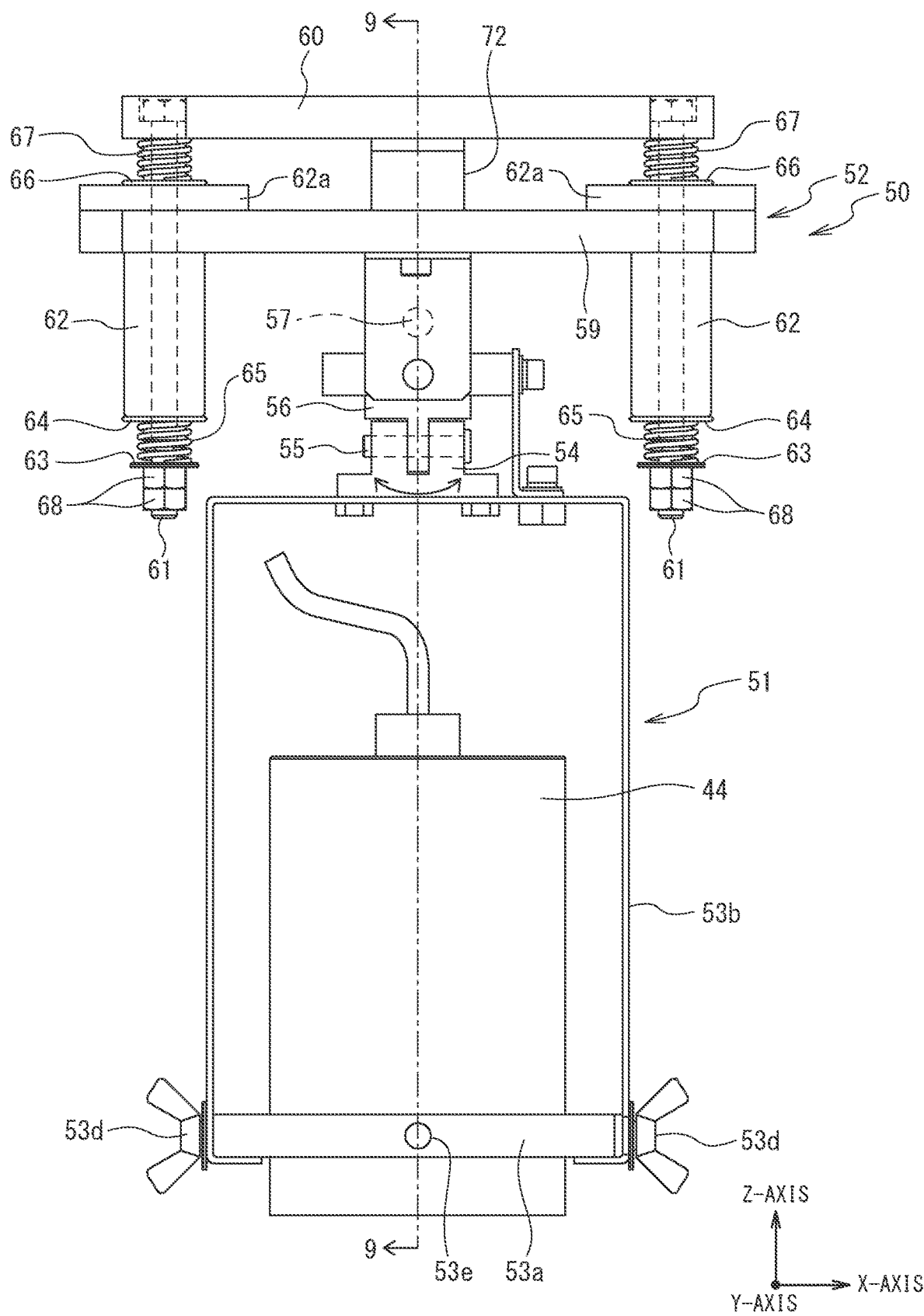
FIG. 8 is a left side view of the follow-up mechanism causing the mounted head to follow the uneven state of the surface of the steel plate in the moving inspection device body illustrated in FIG. 3.
Figure 9:
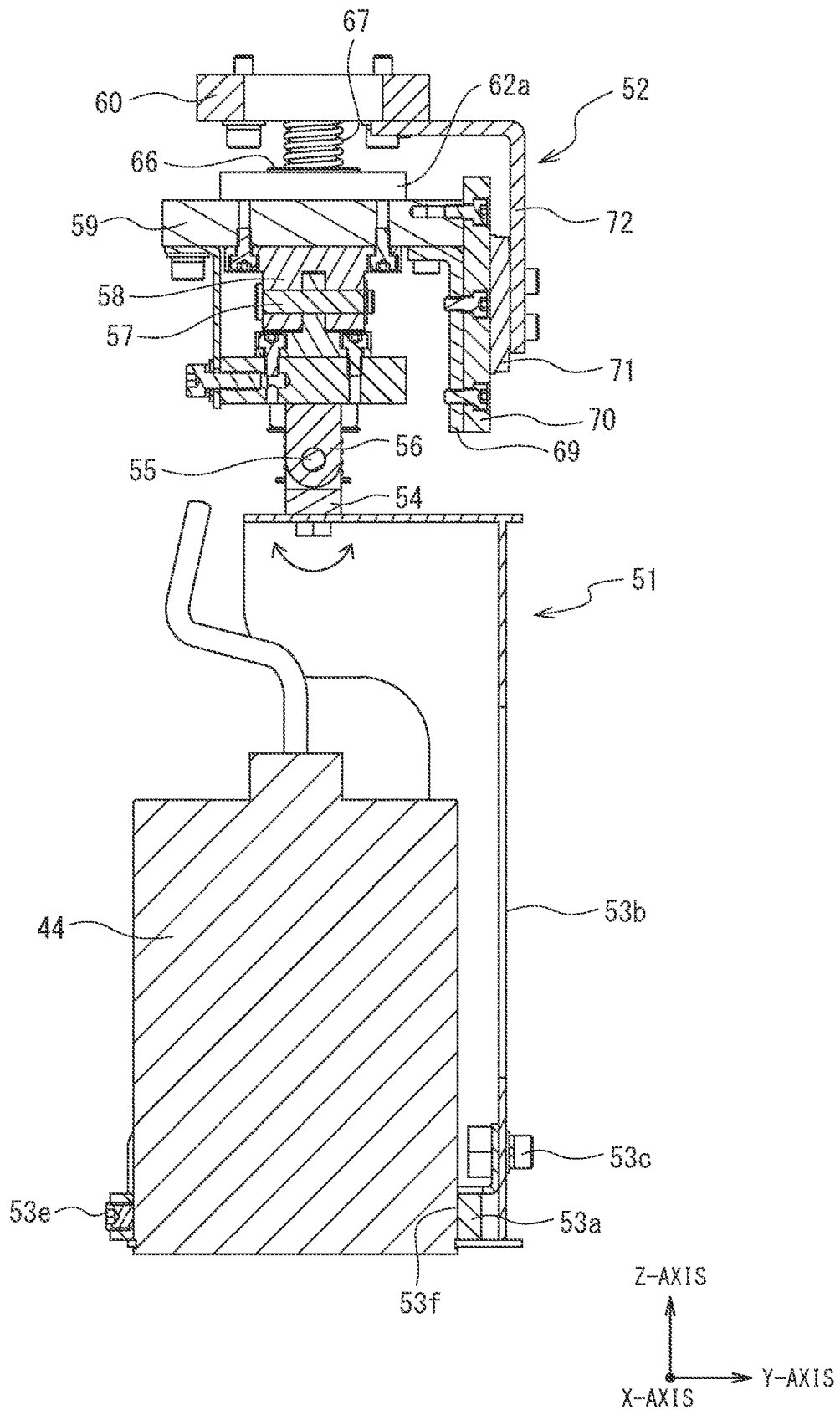
FIG. 9 is a cross-sectional view cut along the line 9-9 in FIG. 8.

The sensor holding mechanism 51 includes a flat plate-like holder 53a holding the flaw detection head 44 to surround the periphery of the flaw detection head 44 as illustrated in FIG. 8. As illustrated in FIG. 9, the flaw detection head 44 is inserted into a through hole 53f formed in the center of the holder 53a, and the flaw detection head 44 is pressed from the outer periphery by a screw member 53e to be held by the holder 53a. The sensor holding mechanism 51 further includes a sensor holding frame member 53b fixing the holder 53a holding the flaw detection head 44 and surrounding the flaw detection head 44 from the periphery. The holder 53a is fixed to the sensor holding frame member 53b by a bolt 53c and a wing bolt 53d.

As illustrated in FIG. 8 and FIG. 9, a first support member 54 is fixed to the upper surface of the sensor holding frame member 53b and the first support member 54 is rotatably supported around a first hinge 55 with respect to a second support member 56. The first hinge 55 extends in the X-axis direction as illustrated in FIG. 8 and FIG. 9. More specifically, the sensor holding frame member 53b holding the flaw detection head 44 is configured to rotate around the X-axis. The X-axis extends in parallel to and in the forward and backward (width) direction with respect to the surface Sa of the steel plate S.

As illustrated in FIG. 9, the second support member 56 is rotatably supported around a second hinge 57 with respect to a third support member 58. The second hinge 57 extends in the Y-axis direction as illustrated in FIG. 8 and FIG. 9. More specifically, the sensor holding frame member 53b holding the flaw detection head 44 is configured to rotate around the Y-axis. The Y-axis extends in the right and left (longitudinal) direction parallel to the surface Sa of the steel plate S and orthogonal to the X-axis.

Figure 7:
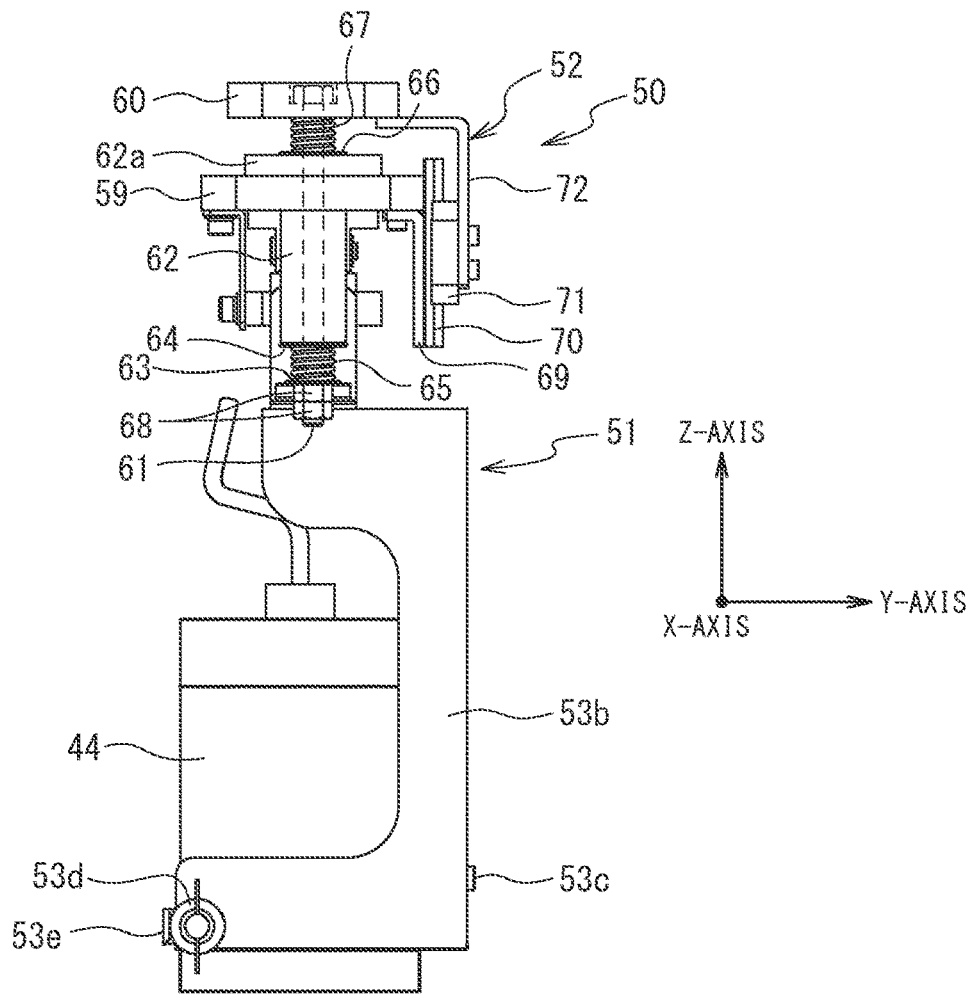
FIG. 7 is a front view of the follow-up mechanism causing the mounted head to follow the uneven state of the surface of the steel plate in the moving inspection device body illustrated in FIG. 3.

Each of the rotation around the X-axis and the rotation around the Y-axis of the sensor holding frame member 53b is regulated in some cases. Considering the cases, FIG. 7 to FIG. 9 illustrate members regulating each of the rotation around the X-axis and the rotation around the Y-axis of the sensor holding frame member 53b.

As illustrated in FIG. 9, the third support member 58 is attached to the undersurface of a lower flat plate 59 having a predetermined plate thickness and extending in the right and left direction and in the forward and backward direction. An end part in the right and left direction of the lower flat plate 59 is attached with an attachment plate 69 and a rail member 70 extending in the Z-axis direction. Above the lower flat plates 59, upper flat plates 60 having a predetermined plate thickness and extending in the right and left direction and in the forward and backward direction are provided. As illustrated in FIG. 3, the upper flat plates 60 are attached to the undersurfaces of the first plate members 40 projecting from the ends in the right and left direction of the carriage 31. To the undersurfaces of the upper flat plates 60, attachment plate parts 72 each attached with a slider 71 at the tip are fixed. The slider 71 is configured to move along the rail member 70 attached to the lower flat plate 59. More specifically, the slider 71 is fixed to the upper flat plate 60 fixed to the first plate member 40 fixed to the carriage 31, and therefore the lower flat plate 59 moves up and down along a direction in which the rail member 70 extends. Therefore, the sensor holding frame member 53b holding the flaw detection head 44 is configured to move up and down along the Z-axis extending perpendicularly (up and down) to the surface Sa of the steel plate S.

Next, the load adjustment mechanism 52 adjusts a load applied to the surface Sa of the steel plate S by the flaw detection head 44 held by the sensor holding mechanism 51. As described above, the sensor holding frame member 53b holding the flaw detection head 44 moves up and down along the Z-axis extending perpendicularly (up and down) to the surface Sa of the steel plate S. Therefore, when no load acts on the sensor holding frame member 53b, the self-weight of the entire configuration up to the lower flat plate 59 including the flaw detection head 44 and the sensor holding frame member 53b acts on the surface Sa of the steel plate S. When the self-weight of the entire configuration up to the lower flat plate 59 including the flaw detection head 44 and the sensor holding frame member 53b acts on the surface Sa of the steel plate S, the load is excessively large in the flaw detection by the flaw detection head 44, which hinders the flaw detection. Therefore, in this embodiment, the load adjustment mechanism 52 adjusts the load applied to the surface Sa of the steel plate S by the flaw detection head 44.

In the load adjustment mechanism 52, bushes 62 each including a flange 62a at one end of a hollow pipe part are press-fitted and fixed to the vicinity of both ends in the forward and backward direction of the lower flat plate 59 such that the flange 62a is in contact with the upper surface of the lower flat plate 59 and the hollow pipe part is inserted through the lower flat plate 59 and projects downward from the lower flat plate 59 as illustrated in FIG. 8. A shaft 61 inserted through each bush 62 is fixed to the upper flat plate 60. Near the lower end of each shaft 61, a male screw part is formed and a plurality of nuts 68 for load adjustment is screwed into the male screw part. A metal washer 63 is arranged above each nut 68, a metal washer 64 is arranged below each bush 62, and a compression coil spring 65 is arranged to surround each shaft 61 between both the metal washers 63, 64. The compression coil spring 65 acts to push the lower flat plate 59, i.e., the entire configuration up to the lower flat plate 59 including the flaw detection head 44 and the sensor holding frame member 53b, upward via the bush 62. On the other hand, a metal washer 66 is arranged above the flange 62a of the bush 62 and a compression coil spring 67 is arranged to surround the shaft 61 between the metal washer 66 and the undersurface of upper flat plate 60. The compression coil spring 67 acts to push the lower flat plate 59, i.e., the entire configuration up to the lower flat plate 59 including the flaw detection head 44 and the sensor holding frame member 53b, downward via the bush 62. By adjusting the push-up force by the compression coil spring 65 and the push-down force by the compression coil spring 67, the load applied to the surface Sa of the steel plate S by the entire configuration up to the lower flat plate 59 including the flaw detection head 44 and the sensor holding frame member 53b is adjusted.

In usual, the load is adjusted such that a value obtained by subtracting the push-down force by the compression coil spring 67 from the push-up force by the compression coil spring 65 is positive. Thus, the entire configuration up to the lower flat plate 59 including the flaw detection head 44 and the sensor holding frame member 53b is pushed upward, so that the self-weight of the entire configuration up to the lower flat plate 59 including the flaw detection head 44 and the sensor holding frame member 53b acting on the surface Sa of the steel plate S is subtracted.

Thus, the load applied to the surface Sa of the steel plate S by the flaw detection head 44 is adjusted.

As described above, the follow-up mechanism. 50 includes the sensor holding mechanism 51 holding the flaw detection head 44 as the inspection sensor and the load adjustment mechanism 52 adjusting the load applied to the surface Sa of the steel plate S by the flaw detection head 44 held by the sensor holding mechanism 51. The sensor holding mechanism 51 rotates around the X-axis extending in parallel to the surface Sa of the steel plate S and the Y-axis extending in a direction parallel to the surface Sa of the steel plate S and orthogonal to the X-axis, and moves up and down along the Z-axis extending perpendicularly to the surface Sa of the steel plate S.

Figure 10:
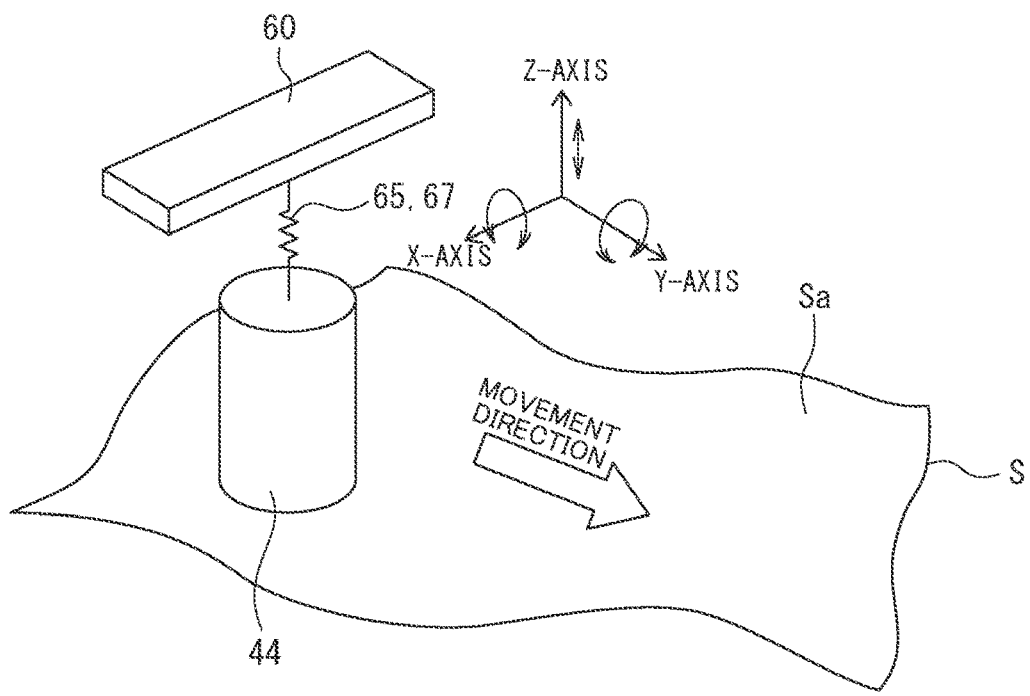
FIG. 10 is a schematic diagram for explaining the follow-up mechanism in the moving inspection device body illustrated in FIG. 3.

Thus, as illustrated in FIG. 10, when the flaw detection head 44 scans (moves over) the surface Sa of the steel plate S, the flaw detection head 44 held by the sensor holding mechanism 51 rotates around the X-axis and the Y-axis in a state where a predetermined load is applied to the surface Sa of the steel plate S according to the uneven state of the surface Sa of the steel plate S. Further, the flaw detection head 44 can move up and down along the Z-axis, and thus the flaw detection head 44 can follow the uneven state of the surface Sa of the steel plate S with an appropriate pressing force.

Next, the water supply devices 80 are described. The inspection device body 30 inspects the steel plate S for internal defects of the steel plate S and surface defects of the rear surface side of the steel plate S by ultrasonic the flaw detection, and therefore the surface (inspection surface) Sa of the steel plate S requires water as a medium for passing ultrasonic waves. To spray this water onto the surface Sa of the steel plate S, the moving inspection device 20 includes the water supply devices 80 supplying the water W required for the inspection onto the surface Sa of the steel plate S as illustrated in FIG. 1 and FIG. 13.

The water supply devices 80 are provided separately from the inspection device body 30. In this embodiment, as illustrated in FIG. 1, a pair of water supply devices 80 is installed on the end surfaces on the long-side sides facing each other of the steel plate S formed in a rectangular shape.

Figure 13:
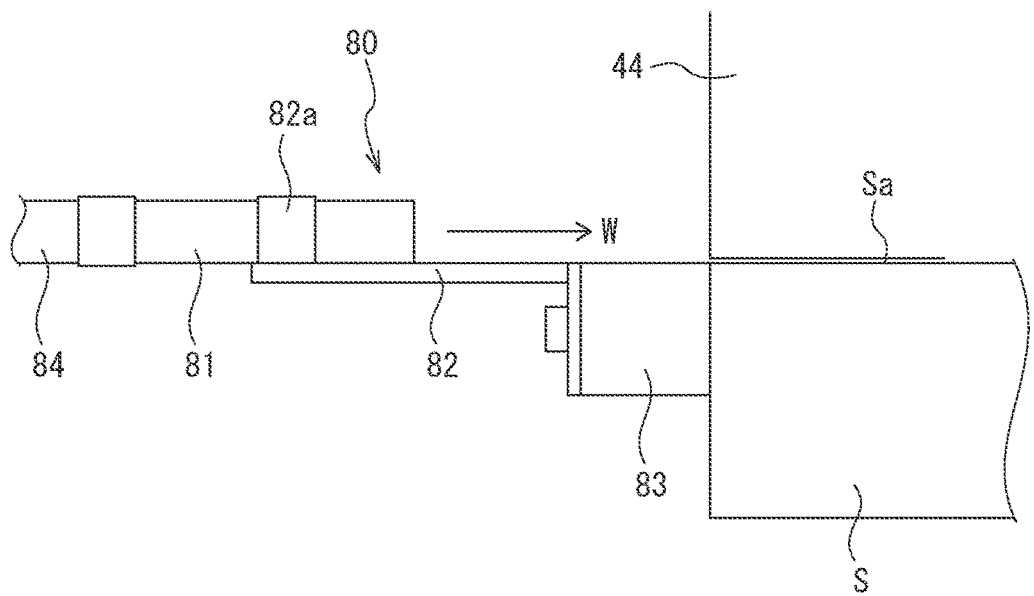
FIG. 13 is a view for explaining the schematic configuration of a water supply device constituting the moving inspection device according to one embodiment of the present invention.

Each water supply device 80 includes a nozzle 81 supplying the water W onto the surface Sa of the steel plate S as illustrated in FIG. 1 and FIG. 13. The nozzle 81 includes a flat spray nozzle, and the water W is jetted from the nozzle 81 to spread in a fan shape.

Herein, the nozzle 81 is attached by a fixing member 82a onto an attachment plate 82 of a rectangular flat plate shape fixed to a magnet-type attachment base 83 such that the upper surface is flush with the attachment base 83, the attachment base 83 being detachably attached to the end surface of the steel plate S such that the upper surface is flush with the surface Sa of the steel plate S. The nozzle 81 is installed at a position separated from the end surface of the steel plate S by a predetermined distance such that the tip of the nozzle 81 does not abut on the flaw detection head 44 which has moved to the end surface side of the steel plate S as illustrated in FIG. 1 and FIG. 13.

A water supply hose 84 is connected to each nozzle 81, and the two water supply hoses 84 are connected to a hose 86 connected to a water supply source (not illustrated) by a joint 85.

When the water W is supplied from the water supply source to the nozzles 81 via the hose 86 and the water supply hoses 84, the water W is jetted from the nozzles 81 in a fan shape and supplied onto the surface Sa of the steel plate S through the upper surface of the attachment plate 82 and the upper surface of the attachment base 83. Thus, the water W is sprayed onto the surface Sa of the steel plate S.

As described above, in the moving inspection device 20 according to this embodiment, the water supply devices 80 supplying the water W required for the inspection onto the surface Sa of the steel plate S as the inspection target are installed separately from the inspection device body 30, and therefore the inspection device body 30 itself is reduced in size and weight, so that the moving inspection device 20 capable of realizing significant size reduction/weight reduction can be achieved. One in which a water tank is installed in the inspection device body 30 itself requires, when the water W is used up, labor of supplying the water W to the water tank again. However, the moving inspection device 20 according to this embodiment has eliminated a fear of using up water.

On the other hand, when the water W is supplied onto the surface Sa of the steel plate S from the water supply devices 80 provided separately from the inspection device body 30, the water cannot be uniformly sprayed onto the surface Sa of the steel plate S depending on the state of the surface Sa of the steel plate S, which hinders the inspection of the steel plate S for defects by the ultrasonic flaw detection in some cases. For example, when the surface Sa (inspection surface) of the steel plate S is slightly tilted or when the surface Sa has small waviness, unevenness, or the like, unevenness arises in water film formation on the surface Sa, so that a water film is insufficient in the flaw detection heads 44 in some cases. In that case, measurement is performed such that a defect is present even though no defects are present inside the steel plate S (pseudo-detection) in some cases, and therefore water needs to be surely supplied to parts of the flaw detection heads 44.

In order to solve this problem, the inspection device body 30 is installed with a flow adjustment plate 73 as illustrated in FIG. 1 and FIG. 3 to FIG. 5 in this embodiment.

The flow adjustment plate 73 is installed with a flow adjustment plate attachment member 74 on the undersurface of the carriage 31 to project from the carriage 31 in the advancing direction (backward direction, downward direction in FIG. 4) in an inspection path of the inspection device body 30 as illustrated in FIG. 3 to FIG. 5.

The inspection device body 30 advances toward the backward side of the carriage 31 in the inspection path and advances to the front side of the carriage 31 in a movement path, which is described later.

The flow adjustment plate attachment member 74 includes a pair of right and left support leg parts 74a extending downward from the undersurface of the carriage 31 and an arc-shaped attachment plate part 74b attached to the rear ends of both the support leg parts 74a to be bridged therebetween and having a projecting and arc-shaped rear side.

As illustrated in FIG. 4, the flow adjustment plate 73 has a first arc surface 73a and a second arc surface 73b having a slightly smaller diameter than the diameter of the first arc surface 73a, has an arc shape formed into a predetermined plate thickness, and is attached to the rear surface of the arc-shaped attachment plate part 74b such that the first arc surface 73a projects toward the advancing direction (lower side and rear side in FIG. 4) in the inspection path of the inspection device body 30. The flow adjustment plate 73 is attached to the arc-shaped attachment plate part 74b to form a gap such that a water film is formed between the flow adjustment plate 73 and the surface Sa of the steel plate S.

Figure 11:
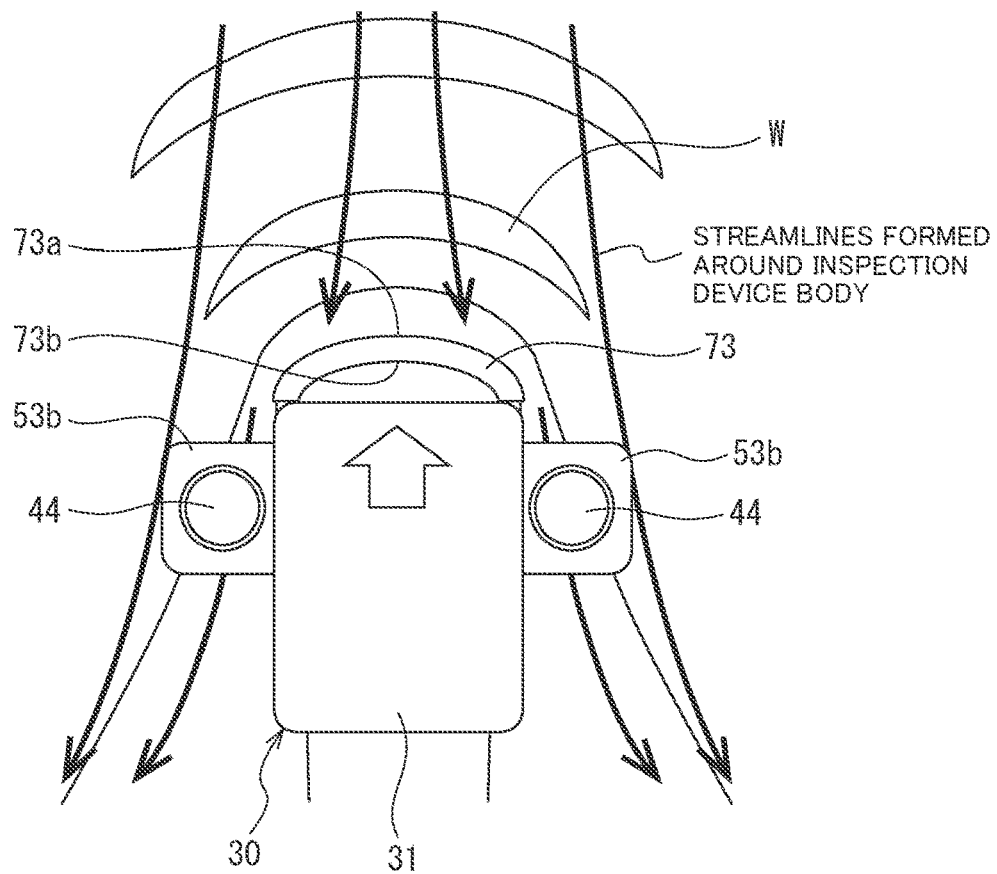
FIG. 11 is a view for explaining the function of a flow adjustment plate when the flow adjustment plate is formed in an arc shape having an arc surface and the flow adjustment plate is arranged such that the arc surface (first arc surface) projects toward the advancing (inspection) direction of the moving inspection device body.

As illustrated in FIG. 11, the flow adjustment plate 73 pushes out the water W supplied onto the surface Sa of the steel plate S from the water supply devices 80 in the advancing direction and forms streamlines for supplying the water between the flaw detection heads 44 and the surface Sa of the steel plate S simultaneously with the movement of the inspection device body 30 (in FIG. 11, the inspection device body 30 moves upward (backward) in the inspection path described later as illustrated by a thick arrow).

The flow adjustment plate 73 pushes out the water W supplied onto the surface Sa of the steel plate S from the water supply devices 80 in the advancing direction simultaneously with the movement of the inspection device body 30 (movement in the inspection path). Thus, in the ultrasonic flaw detection by the inspection device body 30, the water W can be uniformly supplied even to places where the surface Sa (inspection surface) of the steel plate S is slightly tilted or the surface Sa has small waviness, unevenness, or the like, so that the water can be uniformly sprayed onto the surface Sa of the steel plate S.

The flow adjustment plate 73 forms the streamlines for supplying the water between the flaw detection heads 44 and the surface Sa of the steel plate S simultaneously with the movement of the inspection device body 30. Therefore, in the ultrasonic flaw detection by the inspection device body 30, the water W required for the inspection can be efficiently supplied between the flaw detection heads 44 and the surface Sa of the steel plate S.

Thus, in the moving inspection device 20 according to this embodiment, the measurement such that a defect is present even though no defects are present inside the steel plate S (pseudo-detection) can be avoided and the inspection device body 30 itself can be reduced in size and weight, so that significant size reduction/weight reduction can be realized without affecting the inspection performance for the steel plate S.

Figure 12:
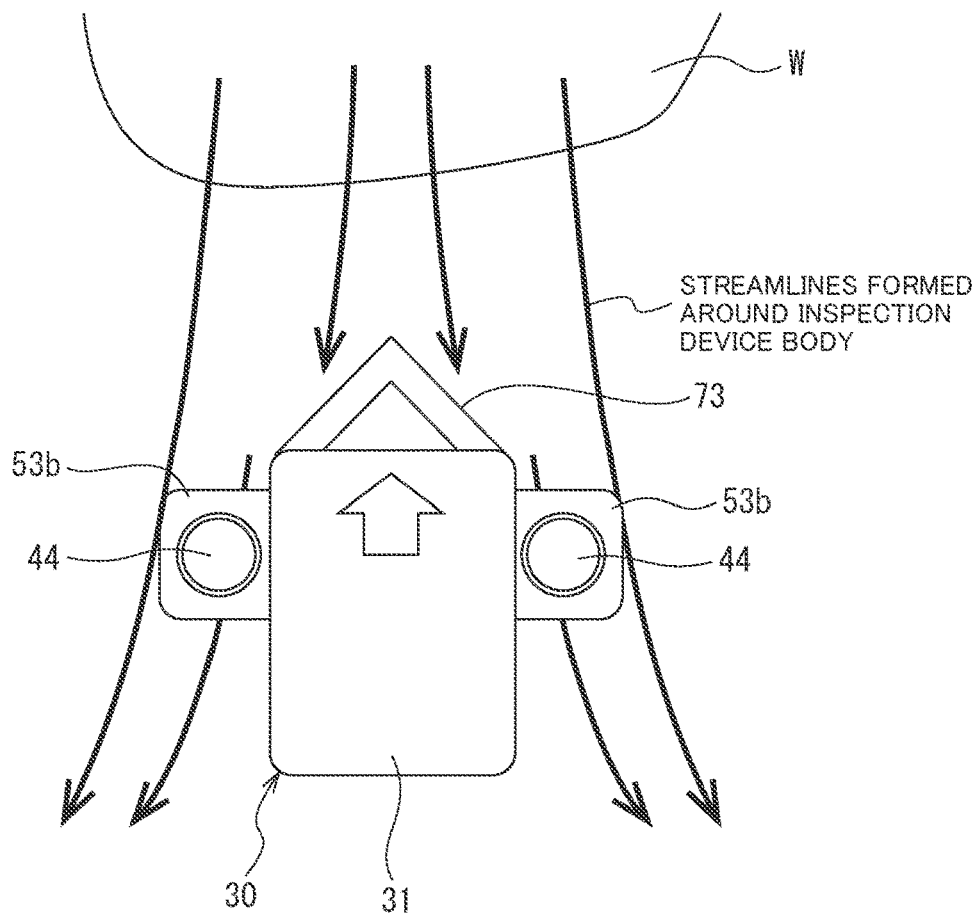
FIG. 12 is a view for explaining the flow adjustment plate when the flow adjustment plate is formed in a triangular shape and the flow adjustment plate is arranged such that the apex projects toward the advancing (inspection) direction of the moving inspection device body.

As illustrated in FIG. 12, the flow adjustment plate 73 may be formed in a triangular shape and the flow adjustment plate may be arranged such that the apex projects toward the advancing (inspection) direction (upper side in FIG. 12) of the inspection device body.

However, in this case, the streamlines for supplying the water between the flaw detection heads 44 and the surface Sa of the steel plate S are formed simultaneously with the movement of the inspection device body 30, but a function of pushing out the water W supplied onto the surface Sa of the steel plate S from the water supply devices 80 in the advancing direction is slightly poor. Therefore, in the ultrasonic flaw detection by the inspection device body 30, the water W cannot be uniformly supplied in some cases to places where the surface Sa (inspection surface) of the steel plate S is slightly tilted or the surface Sa has small waviness, unevenness, or the like.

Therefore, as illustrated in FIG. 11, it is preferable that the flow adjustment plate 73 is formed in an arc shape and is arranged such that the first arc surface (arc surface) 73a projects toward the advancing direction of the inspection device body 30.

Figure 15:
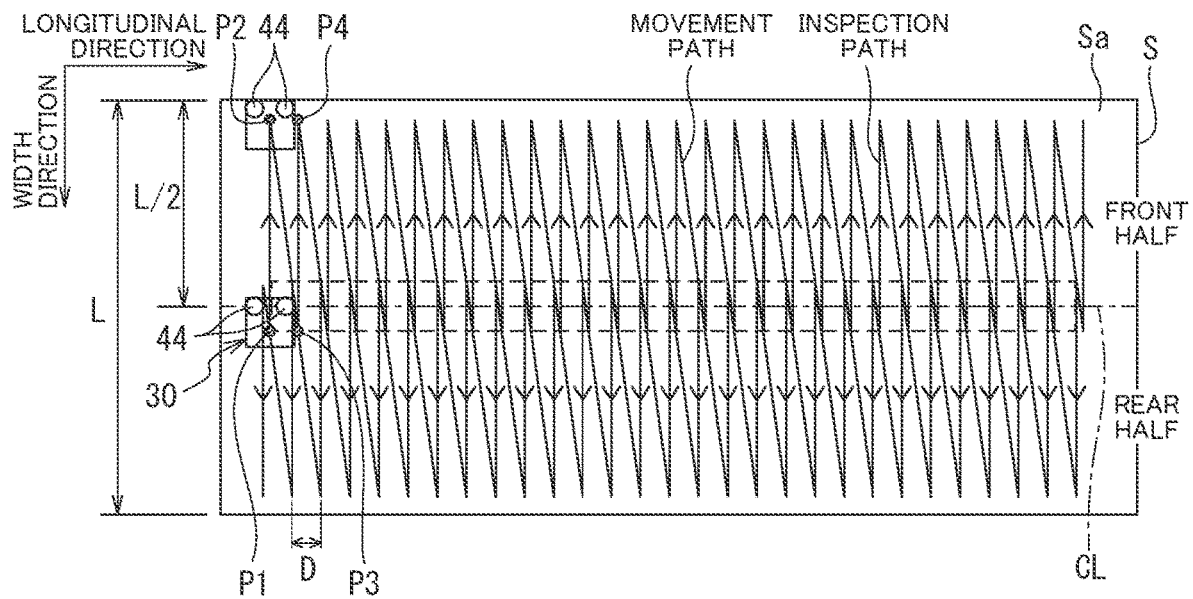
FIG. 15 is a view for explaining a movement pattern of the moving inspection device body when detecting flaws inside a steel plate.
Figure 16:
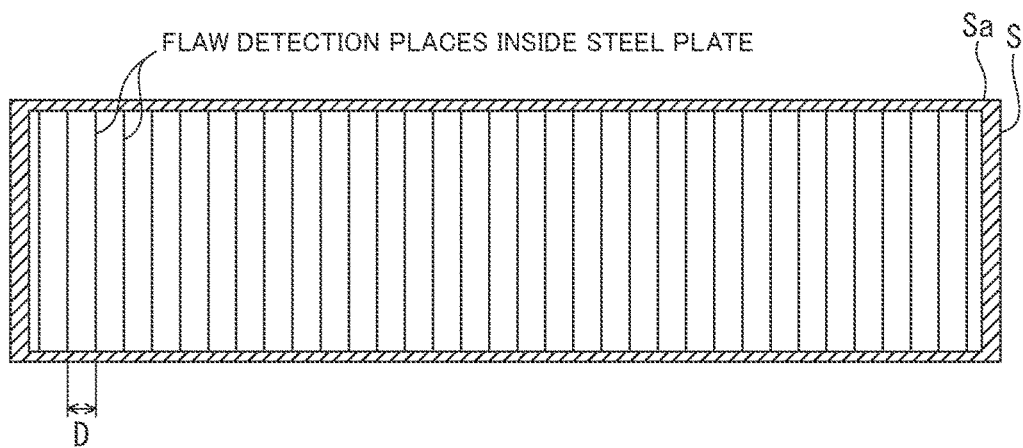
FIG. 16 is a view illustrating an example of an inspection pattern according to JIS G0801: Ultrasonic testing of steel plates for pressure vessels, in which the moving inspection device body moves in the movement pattern illustrated in FIG. 15 to detect flaws inside the steel plate.

Next, a moving inspection method using the moving inspection device 20 illustrated in FIG. 1 is described with reference to FIG. 15 and FIG. 16. FIG. 15 is a view for explaining a movement pattern of a moving inspection device body when detecting flaws inside a steel plate. FIG. 16 is a view illustrating an example of an inspection pattern according to JIS G0801: Ultrasonic testing of steel plates for pressure vessels, in which the moving inspection device body moves in the movement pattern illustrated in FIG. 15 to detect flaws inside the steel plate.

First, in the moving inspection of the steel plate S using the moving inspection device 20, the water W is supplied onto the surface Sa of the steel plate S as the inspection target from the water supply devices 80, so that the water W is uniformly sprayed onto the surface Sa of the steel plate S. The supply of the water W by the water supply devices 80 is constantly performed during the inspection of the steel plate S.

Subsequently, the inspection device body 30 of the moving inspection device 20 is moved over the surface Sa of the steel plate S in the movement pattern illustrated in FIG. 15 to detect flaws inside the steel plate S.

Herein, the current position calculation unit 13 of the on-board computer 36 mounted in the inspection device body 30 calculates the current positions of the navigation receivers 12 based on the reception information received by the navigation receivers 12. The position deviation calculation unit 14 calculates a deviation of the current position with respect to the target inspection position based on the current positions of the navigation receivers 12 calculated by the current position calculation unit 13 and the target inspection position from the setting/evaluation unit 15. The drive control unit 16 outputs a control signal, such as a speed command, to the wheel driving motor 33 such that the deviation calculated by the position deviation calculation unit 14 is 0 and performs feedback control of the speed (including the rotation direction) of the wheels 32, so that the inspection device body 30 autonomously travels along the target travel route.

Herein, the target travel route of the inspection device body 30, i.e., the movement pattern of the inspection device body, is as illustrated in FIG. 15. First, the surface Sa (inspection surface) of the steel plate S as the inspection target is virtually divided into a front half and a rear half with a center line CL in the width direction of the steel plate S as the center.

Then, in the front half, the inspection device body 30 repeats the inspection path and the movement path described later from one end side in the longitudinal direction of the steel plate S (left end side of the steel plate S in FIG. 15) to the other end side in the longitudinal direction of the steel plate S (right end side of the steel plate S in FIG. 15), thereby detecting flaws inside the steel plate S.

Herein, in the front half, the inspection device body 30 starts the movement from a position where the center as viewed from the plane is located at a point P1 where the flaw detection heads 44 are located on the center line CL with the backward of the carriage 31 as the advancing direction and, simultaneously therewith, the flaw detection heads 44 move in the width direction of the steel plate S while detecting flaws. Then, the inspection device body 30 reaches a position where the center as viewed from the plane is located at a point P2 where the flaw detection heads 44 are located on the side edge of the steel plate S, and then stops. In this embodiment, the movement of the inspection device body 30 from the point P1 to the point P2 is referred to as the inspection path. The movement of the inspection device body 30 in the inspection path is a straight-ahead movement in which the same rotation speed is applied to the right and left wheels 32.

Thereafter, the inspection device body 30 rotates each wheel 32 backward while applying different rotation speeds to the right and left wheels 32, so that the inspection device body 30 moves from the position where the center as viewed from the plane is located at the point P2 where the flaw detection heads 44 are located on the side edge of the steel plate S with the front of the carriage 31 as the advancing direction, reaches a position where the center as viewed from the plane is located at a point P3 where the flaw detection heads 44 are located on the center line CL in the width direction of the steel plate S, and then stops. The point P1 and the point P3 are separated by one pitch D along the longitudinal direction of the steel plate S. In the present embodiment, the movement of the inspection device body 30 from the point P2 to the point P3 is referred to as the movement path. In this movement path, the flaw detection is simultaneously performed by the flaw detection heads 44 but the inspection data is erased in the setting/evaluation unit 15 described later. The movement of the inspection device body 30 in the movement path is a curvilinear movement in which different rotation speeds are applied to the right and left wheels 32.

Thereafter, in the front half, the inspection device body 30 repeats the inspection path and the movement path to the other end side in the longitudinal direction of the steel plate S, thereby completing the inspection in the front half.

Then, when the inspection in the front half is completed, the inspection device body 30 rotates the right and left wheels 32 forward and backward to perform pivotal turn to turn 180°. Thus, the flaw detection heads 44 are directed in the opposite direction in the width direction of the steel plate S.

Then, in the rear half, the inspection device body 30 repeats an inspection path and a movement path similar to those in the front half of the inspection from the other end side in the longitudinal direction of the steel plate S (right end side of the steel plate S in FIG. 15) to the one end side in the longitudinal direction of the steel plate S (left end side of the steel plate S in FIG. 15), thereby detecting flaws inside the steel plate S.

Thus, as in the example of the inspection pattern according to JIS G0801: Ultrasonic testing of steel plates for pressure vessels illustrated in FIG. 16, the flaw detection inside the steel plate S is carried out at the pitch D along the longitudinal direction of the steel plate S.

As illustrated in FIG. 2, the inspection data obtained by the flaw detection heads 44 is transmitted to the setting/evaluation unit 15 of the on-board computer 36 via the ultrasonic flaw detector body 43 and the IO board 37 for evaluation.

As described above, the moving inspection device 20 according to the present embodiment includes the inspection device body 30 inspecting the steel plate S for defects while moving over the surface Sa of the steel plate S as the inspection target and the water supply devices 80 provided separately from the inspection device body 30 and supplying the water W required for the inspection onto the surface Sa of the steel plate S.

Thus, the inspection device body 30 itself is reduced in size and weight, and thus the moving inspection device 20 capable of realizing significant size reduction/weight reduction can be achieved. One in which a water tank is installed in the inspection device body 30 itself requires, when the water W is used up, labor of supplying the water W to the water tank again. However, the moving inspection device 20 according to this embodiment has eliminated a fear of using up water.

The inspection device body 30 is further installed with the flow adjustment plate 73 pushing out the water W supplied onto the surface Sa of the steel plate S from the water supply devices 80 in the advancing direction and forming the streamlines for supplying the water W between the flaw detection heads 44 as the inspection sensors inspecting the steel plate S for defects and the surface Sa of the steel plate S simultaneously with the movement of the inspection device body 30 (movement in the inspection path).

Thus, in the ultrasonic flaw detection by the inspection device body 30, the water W can be uniformly supplied even to places where the surface Sa (inspection surface) of the steel plate S is slightly tilted or the surface Sa has small waviness, unevenness, or the like, so that the water can be uniformly sprayed onto the surface Sa of the steel plate S. The flow adjustment plate 73 forms the streamlines for supplying the water between the flaw detection heads 44 and the surface Sa of the steel plate S simultaneously with the movement of the inspection device body 30. Therefore, in the ultrasonic flaw detection by the inspection device body 30, the water W required for the inspection can be efficiently supplied between the flaw detection heads 44 and the surface Sa of the steel plate S.

Thus, in the moving inspection device 20 according to this embodiment, the measurement such that a defect is present even though no defects are present inside the steel plate S (pseudo-detection) can be avoided and the inspection device body 30 itself can be reduced in size and weight, so that significant size reduction/weight reduction can be realized without affecting the inspection performance for the steel plate S.

The flow adjustment plate 73 is formed in an arc shape having the first arc surface 73a and is arranged such that the first arc surface 73a projects toward the advancing direction in the inspection path of the inspection device body 30.

Thus, the flow adjustment plate 73 can push out the water W supplied onto the surface Sa of the steel plate S from the water supply devices 80 in the advancing direction and appropriately form a flow for supplying the water W between the flaw detection heads 44 inspecting the steel plate S for defects and the surface Sa of the steel plate S simultaneously with the movement of the inspection device body 30.

Further, according to the moving inspection device 20 of this embodiment, the inspection device body 30 includes the follow-up mechanism 50 of causing the flaw detection heads 44 as the inspection sensors to follow the uneven state of the surface Sa of the steel plate S as the inspection target.

Thus, when the flaw detection heads 44 scan (move over) the surface Sa of the steel plate S, the flaw detection heads 44 can follow the uneven state of the surface Sa of the steel plate S and appropriately inspect the steel plate S for defects regardless of the uneven state of the surface Sa of the steel plate S.

The follow-up mechanism 50 includes the sensor holding mechanism 51 holding the flaw detection head 44 as the inspection sensor and the load adjustment mechanism 52 adjusting the load applied to the surface Sa of the steel plate S by the flaw detection head 44 held by the sensor holding mechanism 51. The sensor holding mechanism 51 rotates around the X-axis extending in parallel to the surface Sa of the steel plate S and the Y-axis extending in a direction parallel to the surface Sa of the steel plate S and orthogonal to the X-axis, and moves up and down along the Z-axis extending perpendicularly to the surface Sa of the steel plate S.

Thus, as illustrated in FIG. 10, when the flaw detection heads 44 scan (move over) the surface Sa of the steel plate S, the flaw detection heads 44 held by the sensor holding mechanisms 51 rotate around the X-axis and the Y-axis in a state where a predetermined load is applied to the surface Sa of the steel plate S according to the uneven state of the surface Sa of the steel plate S. Further, the flaw detection head 44 can move up and down along the Z-axis, and the flaw detection head 44 can follow the uneven state of the surface Sa of the steel plate S with an appropriate pressing force.

Further, according to the moving inspection method of this embodiment, the steel plate S as the inspection target is inspected for defects using the above-described moving inspection device 20, and therefore the inspection device body 30 itself is reduced in size and weight, so that the steel plate S as the inspection target can be inspected for defects using the moving inspection device capable of realizing significant size reduction/weight reduction without affecting the inspection performance for the steel plate S.

The steel plate S as a steel material is manufactured through an inspection step of implementing the moving inspection method.

The embodiments of the present invention are described above but the present invention is not limited thereto and can be variously altered or modified.

For example, the inspection target to be inspected by the moving inspection device 20 is not limited to the steel plate S.

The inspection of the steel plate S for defects by the moving inspection device 20 may also include inspecting the steel plate S for all defects including internal defects and surface defects of the front surface side and the rear surface side of the steel plate S without being limited to the inspection of the steel plate S for internal defects and surface defects of the rear surface side by the ultrasonic flaw detection.

The inspection device body 30 is not limited to one having the structure illustrated in FIG. 1 and FIG. 3 to FIG. 5 and may be any one inspecting the steel plate S for defects while moving over the surface Sa of the steel plate S as the inspection target and installed with the flow adjustment plate 73. For example, the wheels 32 are not limited to two wheels and may be three or four wheels.

The flow adjustment plate 73 is not limited to the arc shape having the first arc surface and may be any one pushing out the water W supplied onto the surface Sa of the steel plate S from the water supply devices 80 in the advancing direction and forming the streamlines for supplying the water W between the flaw detection heads 44 as the inspection sensors and the surface Sa of the steel plate S simultaneously with the movement of the inspection device body 30.

The flow adjustment plate 73 may be installed in the carriage 31 by devising the shape such that the water W supplied onto surface Sa of the steel plate S from the water supply devices 80 is pushed out in the advancing direction and the streamlines for supplying the water W are formed between the flaw detection heads 44 as the inspection sensors and the surface Sa of the steel plate S simultaneously with not only in the movement of the inspection device body 30 in the inspection path but in the movement of the inspection device body 30 in the movement path.

The arc shape of the flow adjustment plate 73 may have the first arc surface 73a and may not necessarily have the second arc surface 73b.

The flow adjustment plate 73 may be formed in a triangular shape. In that case, the flow adjustment plate 73 is preferably arranged such that the apex projects toward the advancing direction in the inspection path of the inspection device body 30.

The follow-up mechanism 50 is not limited to one having the sensor holding mechanism 51 and the load adjustment mechanism 52. The sensor holding mechanism 51 holds the flaw detection head 44 as the inspection sensor, rotates around the X-axis extending in parallel to the surface Sa of the steel plate S and the Y-axis extending in a direction parallel to the surface Sa of the steel plate S and orthogonal to the X-axis, and moves up and down along the Z-axis extending perpendicularly to the surface Sa of the steel plate S. The load adjustment mechanism 52 adjusts the load applied by the flaw detection head 44 held by the sensor holding mechanism 51 to the surface Sa of the steel plate S.

Figure 17:
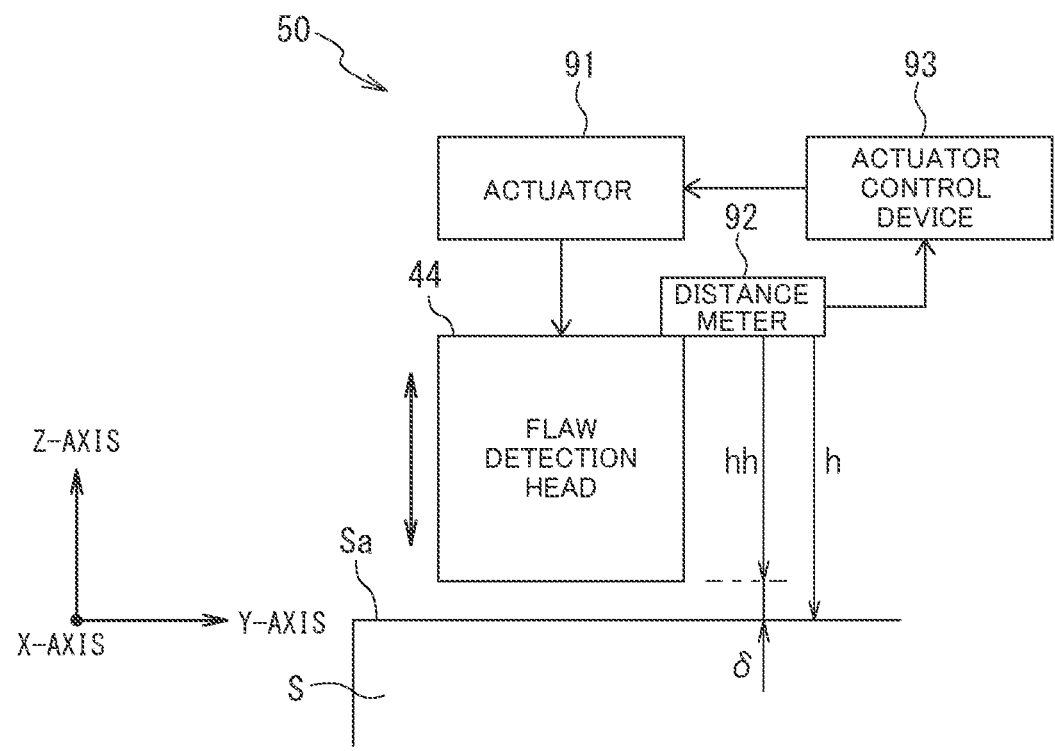
FIG. 17 is a view for explaining a modification of the follow-up mechanism of causing the mounted head to perform follow-up in the moving inspection device body.

For example, as illustrated in FIG. 17, the follow-up mechanism 50 may include an actuator 91, a distance meter 92, and an actuator control device 93. The actuator 91 moves up and down the flaw detection head 44 as the inspection sensor along the Z-axis extending perpendicularly to the surface Sa of the steel plate S as the inspection target. The distance meter 92 measures a distance δ along the Z-axis between the flaw detection head 44 and the surface Sa of the steel plate S. The actuator control device 93 controls the actuator 91 to move up and down the flaw detection head 44 according to the above-described distance δ measured by the distance meter 92 to adjust the above-described distance δ. In FIG. 17, the distance meter 92 is attached to the upper surface of the flaw detection head 44 and the distance meter 92 measures a height h between the upper surface of the flaw detection head 44 and the surface Sa of the steel plate S. Since a height hh of the flaw detection head 44 is known in advance, the distance meter 92 measures the height h between the upper surface of the flaw detection head 44 and the surface Sa of the steel plate S, and then subtracts the height hh of the flaw detection head 44 from the measured height h to calculate the distance δ along the Z-axis between flaw detection head 44 and the surface Sa of the steel plate S.

This enables the follow-up mechanism 50 to actively and appropriately cause the flaw detection head 44 to follow the uneven state of the surface Sa of the steel plate S.

A pair of water supply devices 80 is installed on each of the end surfaces on the long-side sides facing each other of the steel plate S formed in a rectangular shape, but the installation number thereof may be one or three or more. The water supply device 80 can be installed at any position with respect to the steel plate S insofar as the water W can be supplied onto the surface Sa of the steel plate S.

Figure 14A:
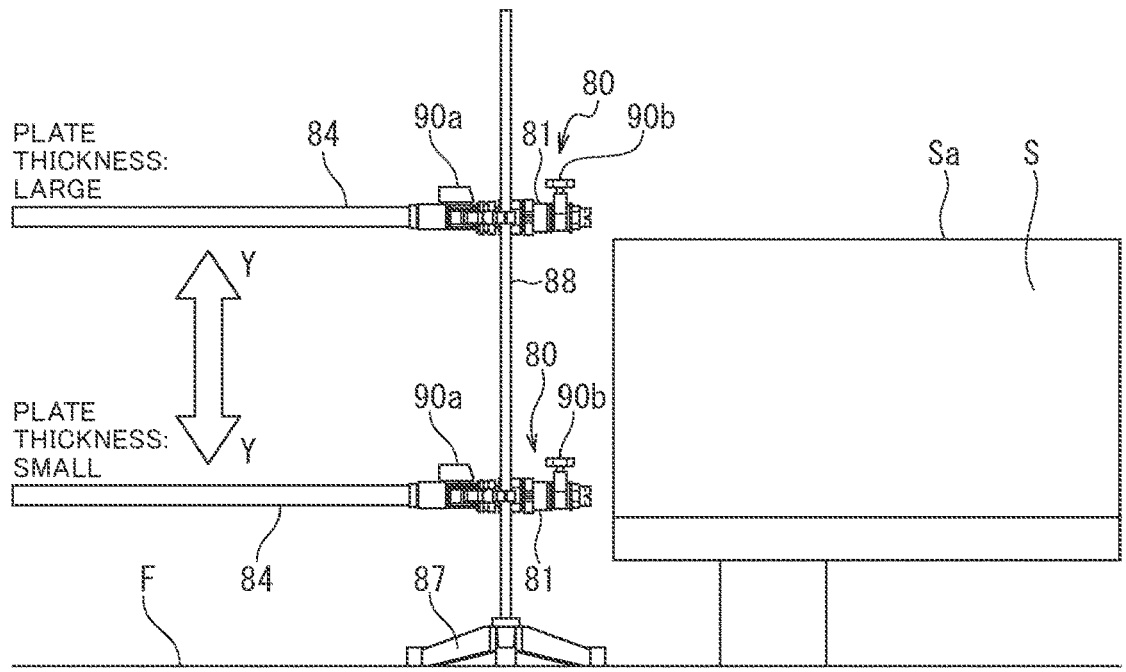
Figure 14B:
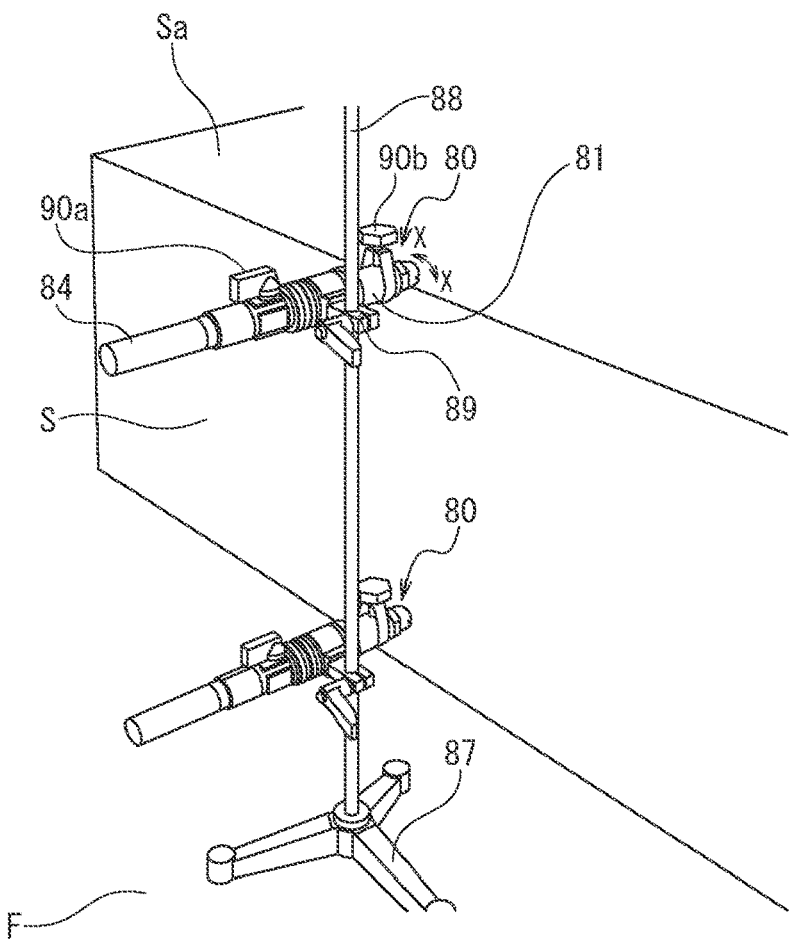

The water supply device 80 may also be modified as illustrated in FIGS. 14A, 14B. FIGS. 14A, 14B illustrate a modification of the water supply device 80, in which FIG. 14A is a side view and FIG. 14B is a perspective view.

The nozzle 81 of the water supply device 80 illustrated in FIG. 13 described above is detachably attached to the end surface of the steel plate S by the magnet-type attachment base 83. In this case, the water supply device 80 is inevitably installed at a position around the end surface of the steel plate S and, depending on the shape of the steel plate S, the water supply device 80 cannot be installed.

In contrast thereto, the water supply device 80 according to the modification illustrated in FIGS. 14A, 14B includes two kinds: the water supply device 80 for large plate thickness and the water supply device 80 for small plate thickness. The water supply device 80 for large plate thickness is supported in an upper part of a bar-shaped support 88 provided in a stand 87 placed on a floor surface F and the water supply device 80 for small plate thickness is supported in a lower part of the support 88.

The nozzle 81 connected to the tip of the water supply hose 84 in each water supply device 80 is supported by a support clamp 89 to be movable up and down with respect to the support 88 (Y-direction indicated by the arrow in FIG. 14A), such that the installation height of the nozzle 81 can be changed according to the height of the surface Sa of the steel plate S. Further, the nozzle 81 is supported by the support clamp 89 to be rotatable in the horizontal rotation direction with respect to the support 88 (X-direction indicated by the arrow in FIG. 14B), such that the direction of the nozzle 81 can be changed. More specifically, the nozzle 81 in each water supply device 80 is provided with the support clamp 89. Each nozzle 81 is then moved in the up and down direction with respect to the support 88 such that the installation height of each nozzle 81 is flush with the surface Sa of the steel plate S, and, simultaneously therewith, each nozzle 81 is rotated with respect to the support 88 such that the direction of the nozzle 81 is located at a desired position, and then the support clamp 89 is tightened in this state, so that each nozzle 81 is supported.

Thus, each nozzle 81 is supported by the support 88 with the installation height and the direction adjusted with respect to the surface Sa of the steel plate S.

According to the water supply device 80 of this modification, each nozzle 81 is supported by the support 88 provided in the stand 87 placed on the floor surface F. Therefore, each nozzle 81 can be arranged as desired around the steel plate S without being constrained by the end surfaces of the steel plate S. Each nozzle 81 is supported by the support 88 with the installation height and the direction adjusted with respect to the surface Sa of the steel plate S. As a result, there is an advantage that each nozzle 81 can be sometimes predominantly arranged in a place where flaw detection water is likely to dry depending on the surface characteristics of the steel plate S and the tilt of the steel plate S, which enables more stable and reliable flaw detection.

Each nozzle 81 in the water supply device 80 according to the modification includes a flow rate adjustment member 90a adjusting the flow rate of the water W supplied from each nozzle 81. Therefore, the flow rate adjustment member 90a can adjust the passage area of a water supply passage in each nozzle 81 to adjust the flow rate of the water W to the surface Sa of the steel plate S from each nozzle 81. As illustrated in FIGS. 14A, 14B, each nozzle 81 is provided with an unsealing plug 90b. When the water W is supplied to the surface Sa of the steel plate S from each nozzle 81, the unsealing plug 90b may be opened after the flow rate is adjusted by the flow rate adjustment member 90a.

In the water supply device 80 according to the modification illustrated in FIGS. 14A, 14B, the water supply devices 80 of the two kinds of the water supply device 80 for large plate thickness and the water supply device 80 for small plate thickness are supported by the support 88, but the present invention is not limited thereto and the water supply device 80 of one kind may be supported or the water supply devices 80 of a plurality (two kinds or more) of kinds may be supported. The number of the stands 87 each having the support 88 is not limited to one. Two or more of the stands 87 may be prepared and each support 88 may support the water supply device 80.

The installation number of the water supply devices 80 is preferably determined according to the surface area of the steel plate S to be supplied with the water W. Thus, the flaw detection can be appropriately performed according to the surface area of the steel plate S.

EXAMPLES

Figure 18:
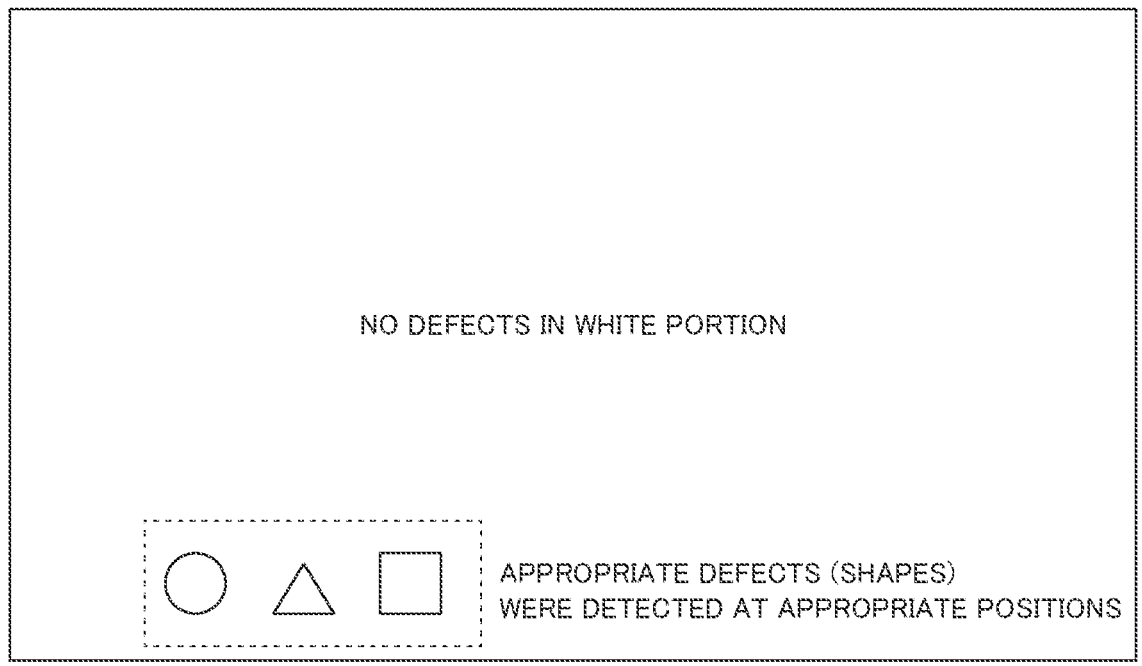
FIG. 18 is a view illustrating an inspection map when a steel plate was inspected for defects by a moving inspection device according to Examples.

A steel plate provided with artificial defects (○, Δ, □) was inspected using the moving inspection device 20 illustrated in FIG. 1 as a moving inspection device according to Examples. An inspection map therefor is illustrated in FIG. 18. The inspection map was created by associating the position of the inspection device body 30 with inspection data at that position.

The positions and the shapes of the artificial defects (○, Δ, □) provided on the steel plate were accurately known in advance, and thus it was able to be confirmed that the inspection by the moving inspection device according to Examples had sufficient accuracy.

The mass of conventional moving inspection devices (moving inspection devices having a configuration similar to that illustrated in PTL 1 or PTL 2) is about 80 kg (exceeds 100 kg when filled with water) because a water tank was provided, and thus the conventional moving inspection devices were very heavy. Therefore, a lifter or the like was used in the movement between steel plates of the moving inspection devices, and thus there was room for improvement.

In contrast thereto, in the moving inspection device according to Examples, the water supply devices 80 were provided separately from the inspection device body 30 and the drive mechanism was innovated (four-wheel drive/four-wheel steering→two-wheel drive/non-steering). Therefore, the mass of the inspection device body 30 itself was reduced to about 20 kg, and, at the same time, the size was also able to be reduced. This enabled manual transportation, which significantly improved the handleability of the inspection device body 30. Further, the water supply devices 80 are very lightweight and may be manually installed on a steel plate for each inspection of the steel plate, and thus the handleability thereof does not matter.

REFERENCE SIGNS LIST

1 inspection system
10 indoor position measuring system
11 navigation transmitter
12 navigation receiver
13 current position calculation unit
14 position deviation calculation unit
15 setting/evaluation unit
16 drive control unit
20 moving inspection device
30 moving inspection device body
31 carriage
32 wheel (drive)
32a rotation shaft
32b first intersecting axis gears
33 wheel driving motor
33a output rotation shaft
33b second intersecting axis gears
34 wheel (omnidirectional)
35 control box 36 on-board computer
37 IO board
38 first raised part
39 second raised part
40 first plate member
41 second plate member
42 third plate member
43 ultrasonic flaw detector body
44 flaw detection head (inspection sensor)
50 follow-up mechanism
51 sensor holding mechanism
52 load adjustment mechanism
53a holder
53b sensor holding frame member
53c bolt
53d wing bolt
53e screw member
53f through hole
54 first support member
55 first hinge
56 second support member
57 second hinge
58 third support member
59 lower flat plate
60 upper flat plate
61 shaft
62 bush
62a flange
63 metal washer
64 metal washer
65 compression coil spring
66 metal washer
67 compression coil spring
68 nut
69 attachment plate
70 rail member
71 slider
72 attachment plate part
73 flow adjustment plate
73a first arc surface (arc surface)
73b second arc surface
74 flow adjustment plate attachment member
74a support leg part
74b arc-shaped attachment plate part
80 water supply device
81 nozzle
82 attachment plate
82a fixing member
83 attachment base
84 water supply hose
85 joint
86 hose
87 stand
88 support
89 support clamp
90a flow rate adjustment member
90b unsealing plug
91 actuator
92 distance meter
93 actuator control device
S steel plate (inspection target)
Sa surface
W water

The invention claimed is:

1. A moving inspection device comprising:
a moving inspection device body configured to inspect an inspection target for a defect while moving over a surface of the inspection target; and
a water supply device provided separately from the moving inspection device body and configured to supply water required for the inspection onto the surface of the inspection target, wherein
the moving inspection device body is installed with a flow adjustment plate configured to push out the water supplied onto the surface of the inspection target from the water supply device in an advancing direction and form a streamline for supplying the water between an inspection sensor configured to inspect the inspection target for the defect and the surface of the inspection target simultaneously with the movement of the moving inspection device body, and
the flow adjustment plate is attached to the moving inspection device body so as to move together with the moving inspection device body.

2. The moving inspection device according to claim 1, wherein the flow adjustment plate is formed in an arc shape having an arc surface or is formed in a triangular shape and is arranged such that the arc surface projects or an apex of the triangular shape projects toward the advancing direction in an inspection path of the moving inspection device body.

3. The moving inspection device according to claim 1, wherein the moving inspection device body includes a follow-up mechanism configured to cause the inspection sensor to follow an uneven state of the surface of the inspection target.

4. The moving inspection device according to claim 3, wherein the follow-up mechanism includes:
a sensor holding mechanism configured to hold the inspection sensor, rotate around an X-axis extending in parallel to the surface of the inspection target and a Y-axis extending in a direction parallel to the surface of the inspection target and orthogonal to the X-axis, and move up and down along a Z-axis extending perpendicularly to the surface of the inspection target; and
a load adjustment mechanism configured to adjust a load applied to the surface of the inspection target by the inspection sensor held by the sensor holding mechanism.

5. The moving inspection device according to claim 3, wherein the follow-up mechanism includes:
an actuator configured to move up and down the inspection sensor along a Z-axis extending perpendicularly to the surface of the inspection target;
a distance meter configured to measure a distance along the Z-axis between the inspection sensor and the surface of the inspection target; and
an actuator control device configured to control the actuator to move up and down the inspection sensor according to the distance along the Z-axis between the inspection sensor and the surface of the inspection target measured by the distance meter to adjust the distance along the Z-axis between the inspection sensor and the surface of the inspection target.

6. The moving inspection device according to claim 1, wherein the water supply device includes a nozzle connected to a tip of a water supply hose and configured to supply water onto the surface of the inspection target.

7. The moving inspection device according to claim 6, wherein the nozzle is supported to be movable up and down with respect to a support provided in a stand placed on a floor surface such that an installation height of the nozzle is changed according to a height of the surface of the inspection target and is supported to be rotatable in a horizontal rotation direction with respect to the support such that a direction of the nozzle is changed.

8. The moving inspection device according to claim 6, wherein the nozzle includes a flow rate adjustment member configured to adjust a flow rate of the water supplied from the nozzle.

9. The moving inspection device according to claim 1, wherein an installation number of the water supply devices is determined according to a surface area of the inspection target supplied with the water.

10. A moving inspection method comprising:
  inspecting an inspection target for a defect using the moving inspection device according to claim 1.

11. A method for manufacturing a steel material comprising:
  an inspection step of implementing the moving inspection method according to claim 10.

* * * * *